United States Patent
Usami

(10) Patent No.: US 10,933,944 B2
(45) Date of Patent: Mar. 2, 2021

(54) DRIVE UNIT AND ELECTRICALLY ASSISTED BICYCLE

(71) Applicant: YAMAHA HATSUDOKI KABUSHIKI KAISHA, Iwata (JP)

(72) Inventor: Tomohiro Usami, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 306 days.

(21) Appl. No.: 16/055,204

(22) Filed: Aug. 6, 2018

(65) Prior Publication Data

US 2019/0047659 A1 Feb. 14, 2019

(30) Foreign Application Priority Data

Aug. 9, 2017 (JP) .............................. JP2017-154821

(51) Int. Cl.
  *B62M 6/55* (2010.01)
  *B60L 58/12* (2019.01)
  *B60L 50/60* (2019.01)
  *B62M 3/00* (2006.01)
  *B62M 6/50* (2010.01)
  *B62M 6/90* (2010.01)

(52) U.S. Cl.
  CPC ............... *B62M 6/55* (2013.01); *B60L 50/66* (2019.02); *B60L 58/12* (2019.02); *B62M 3/003* (2013.01); *B62M 6/50* (2013.01); *B62M 6/90* (2013.01); *B60L 2200/12* (2013.01); *B60L 2240/423* (2013.01)

(58) Field of Classification Search
  CPC ........... B62M 6/55; B62M 6/50; B62M 3/003
  USPC ................... 384/456, 457, 458, 510, 539
  See application file for complete search history.

(56) References Cited

U.S. PATENT DOCUMENTS

| | | | |
|---|---|---|---|
| 3,401,436 A * | 9/1968 | Bradshaw | F16C 35/067 24/456 |
| 5,570,752 A * | 11/1996 | Takata | B62M 6/45 180/206.2 |
| 5,749,429 A | 5/1998 | Yamauchi et al. | |
| 6,276,479 B1 | 8/2001 | Suzuki et al. | |
| 7,967,512 B2 * | 6/2011 | Himeda | F16C 35/067 384/539 |

(Continued)

FOREIGN PATENT DOCUMENTS

| | | |
|---|---|---|
| CN | 85 1 02071 A | 6/1986 |
| CN | 1113048 A | 12/1995 |

(Continued)

*Primary Examiner* — Anne Marie M Boehler
(74) *Attorney, Agent, or Firm* — Keating and Bennett, LLP

(57) ABSTRACT

A drive unit for an electrically assisted bicycle includes a housing, a motor in the housing, a crank shaft extending through the housing along a right-left direction of the bicycle, and a pair of bearings rotatably supporting the crank shaft within the housing, wherein each bearing includes an inner ring and an outer ring. The pair of bearings include a first bearing at one side of a thrust direction and a second bearing at another side along the thrust direction, wherein the thrust direction is an axial direction of the crank shaft. The first bearing does not move along the thrust direction relative to the crank shaft. The drive unit has a movement restricting structure that restricts movement of the first bearing relative to the relative to the housing along the thrust direction.

8 Claims, 9 Drawing Sheets

(56) References Cited

U.S. PATENT DOCUMENTS

| | | | |
|---|---|---|---|
| 8,393,794 B1* | 3/2013 | Shiraishi | B62K 19/34 384/458 |
| 2011/0168472 A1* | 7/2011 | Li | B60L 50/52 180/206.4 |
| 2012/0048634 A1* | 3/2012 | Kuroki | B62M 6/70 180/205.2 |
| 2012/0083957 A1 | 4/2012 | Aoki et al. | |
| 2012/0132019 A1 | 5/2012 | Osterlaenger et al. | |
| 2013/0068921 A1 | 3/2013 | Ikeda | |
| 2013/0133969 A1 | 5/2013 | Shimizu et al. | |
| 2014/0265686 A1* | 9/2014 | Blaetner | F16C 35/067 310/90 |
| 2015/0007689 A1* | 1/2015 | Chonan | F16H 55/30 74/594.2 |
| 2015/0240875 A1 | 8/2015 | Shiraishi | |
| 2017/0260881 A1* | 9/2017 | Kono | F02B 75/16 |
| 2018/0170099 A1* | 6/2018 | Yamazaki | B62M 6/50 |

FOREIGN PATENT DOCUMENTS

| | | |
|---|---|---|
| CN | 2306946 Y | 2/1999 |
| CN | 104010936 A | 8/2014 |
| DE | 10 2009 036 890 A1 | 3/2011 |
| DE | 10 2011 075 708 A1 | 11/2012 |
| DE | 10 2012 221 548 A1 | 5/2013 |
| DE | 10 2015 002 396 A1 | 8/2015 |
| EP | 0 636 538 A1 | 2/1995 |
| EP | 0 847 914 A1 | 6/1998 |
| EP | 2 457 754 A2 | 5/2012 |
| EP | 2 743 169 A1 | 6/2014 |
| EP | 2 783 972 A1 | 10/2014 |
| GB | 2 166 810 A | 5/1986 |
| JP | 03-203554 A | 9/1991 |
| JP | 09-123981 A | 5/1997 |
| JP | 11-227669 A | 8/1999 |
| JP | 2000-318674 A | 11/2000 |
| JP | 4321772 B2 | 8/2009 |
| JP | 4447990 B2 | 4/2010 |
| JP | 5354196 B2 | 11/2013 |
| JP | 5564389 B2 | 7/2014 |
| JP | 2014-196036 A | 10/2014 |
| JP | 2014-196074 A | 10/2014 |
| JP | 2014-196080 A | 10/2014 |
| JP | 5867685 B2 | 2/2016 |
| TW | M436633 U1 | 9/2012 |

* cited by examiner (a)

(b)

(c)

000# DRIVE UNIT AND ELECTRICALLY ASSISTED BICYCLE

CROSS REFERENCE TO RELATED APPLICATIONS

This application claims the benefit of priority to Japanese Patent Application No. 2017-154821 filed on Aug. 9, 2017. The entire contents of this application are hereby incorporated herein by reference.

BACKGROUND OF THE INVENTION

1. Field of the Invention

The present invention relates to a drive unit to be mounted to a body frame of an electrically assisted bicycle. The present invention also relates to an electrically assisted bicycle including such a drive unit.

2. Description of the Related Art

Bicycles are widely prevalent as casual means of transportation, regardless of age and gender. In recent years, electrically assisted bicycles in which a driving power from a motor is utilized to assist the pedaling force of a rider have become more and more prevalent. Electrically assisted bicycles are disclosed in Japanese Laid-Open Patent Publication No. 2014-196080, for example.

An electrically assisted bicycle has a drive unit including a motor and the like. One known type of drive unit is a type which is disposed within the hub of the rear wheel, and another is a type which is mounted at the lower end of the body frame (near the bottom bracket). The latter type of drive unit has become predominant in recent years.

The electrically assisted bicycle disclosed in Japanese Laid-Open Patent Publication No. 2014-196080 includes a drive unit which is mounted at the lower end of the body frame. This drive unit includes a housing, a motor, a crank shaft, and the like. The motor, which is accommodated in the housing, generates a driving power that is utilized to assist the pedaling force of a rider. The crank shaft extends through the housing along the vehicle's right-left direction. Via arms, pedals are mounted to the crank shaft. Within the housing, the crank shaft is rotatably supported by a pair of bearings.

A crank shaft is a member which is also used in any traditional bicycle (i.e., a non-electrically assisted bicycle). In a traditional bicycle, various methods are used to eliminate play of the crank shaft along its axial direction (also called the "thrust direction"), thereby suppressing rattling of the crank shaft. Known examples are a structure in which screws are used to fasten the crank shaft along the axial direction, a construction in which nuts are used to eliminate play, and so on.

On the other hand, in a drive unit (a drive unit of the type which is mounted at the lower end of the body frame) of an electrically assisted bicycle, any thrust load acting on the crank shaft to its right or left is borne by the bearings on both sides. Moreover, a one-way clutch is disposed coaxially with the crank shaft. Therefore, in order to permit relative rotation between members that compose the one-way clutch (i.e., in order to permit sliding between a plurality of mechanical parts), some play is needed along the thrust direction.

However, a user who is accustomed to a traditional bicycle may perceive any movement of the crank shaft due to such play (i.e., movement along the thrust direction) as rattling. The movement of a portion which is normally not expected to move may be felt to the user as an abnormality (loosening).

SUMMARY OF THE INVENTION

Preferred embodiments of the present invention provide drive units and electrically assisted bicycles in which rattling of the crank shaft is significantly reduced or prevented.

According to a preferred embodiment of the present invention, a drive unit to be mounted to a body frame of an electrically assisted bicycle to generate a driving power which is transmitted to a wheel of the electrically assisted bicycle includes a housing; a motor accommodated in the housing; a crank shaft extending through the housing along a right-left direction of the bicycle; and a pair of bearings rotatably supporting the crank shaft within the housing, each of the pair of bearings including an inner ring and an outer ring, wherein, the pair of bearings define a first bearing which is provided at one side along a thrust direction and a second bearing which is provided at another side along the thrust direction, the thrust direction corresponding to an axial direction of the crank shaft; the first bearing is disposed so as not to move along the thrust direction relative to the crank shaft; and the drive unit includes a movement restricting structure that restricts movement of the first bearing relative to the housing along the thrust direction.

In a drive unit according to a preferred embodiment of the present invention, movements of the first bearing relative to the housing are restricted (controlled) along the thrust direction by the movement restricting structure. Since the first bearing is provided so as not to move along the thrust direction relative to the crank shaft, movements of the crank shaft relative to the housing are restricted (controlled) along the thrust direction because the movement restricting structure restricts movement of the first bearing. Thus, according to a preferred embodiment of the present invention, rattling of the crank shaft is significantly reduced or prevented.

According to a preferred embodiment of the present invention, the inner ring of the first bearing is, for example, press-fitted to the crank shaft.

By press-fitting the inner ring of the first bearing to the crank shaft, for example, the first bearing is restrained from moving along the thrust direction relative to crank shaft.

According to a preferred embodiment of the present invention, the outer ring of the first bearing includes an inner peripheral surface, an outer peripheral surface, and a first end surface and a second end surface that connect the inner peripheral surface and the outer peripheral surface to each other; the first end surface is located farther outward in the right-left direction of the bicycle than is the second end surface; the housing includes a first abutment which abuts with the first end surface of the outer ring of the first bearing; the movement restricting structure includes the first abutment of the housing; and the movement restricting structure further includes a plate-shaped member fixed to the housing, the plate-shaped member including a second abutment which abuts with the second end surface of the outer ring of the first bearing so that the outer ring of the first bearing is sandwiched by the second abutment and the first abutment of the housing.

In the case where restriction of the movement of the first bearing is achieved by sandwiching the outer ring of the first bearing with the first abutment of the housing and the second abutment of the plate-shaped member, the movement restricting structure is complete within a region where the first abutment of the housing and the second abutment of the plate-shaped member are disposed. As a result, in a region which is located inside the plate-shaped member, some play is provided to permit relative rotation between elements which are disposed coaxially with the crank shaft (e.g., elements defining a one-way clutch).

According to a preferred embodiment of the present invention, the plate-shaped member is fixed to the housing by a fastener.

The structure in which the plate-shaped member is fixed to the housing by fasteners may be preferable from assemblability and aesthetics standpoints.

According to a preferred embodiment of the present invention, the housing includes a protrusion which is continuous with the first abutment and which protrudes along the thrust direction so as to surround the first bearing; and the plate-shaped member includes a press-fit portion which extends along the thrust direction and is press-fitted onto the protrusion of the housing; and the plate-shaped member is fixed to the housing by the press-fit portion.

The plate-shaped member may include the press-fit portion press-fitted onto the protrusion of the housing, such that the plate-shaped member is fixed to the housing by this press-fit portion.

According to a preferred embodiment of the present invention, the inner ring of the first bearing includes an inner peripheral surface, an outer peripheral surface, and a first end surface and a second end surface that connect the inner peripheral surface and the outer peripheral surface to each other; the drive unit further includes a first circlip and a second circlip sandwiching the inner ring of the first bearing, the first circlip abutting with the first end surface, and the second circlip abutting with the second end surface; the housing includes an indent into which the outer ring of the first bearing is press-fitted; and the movement restricting structure includes the indent of the housing and the outer ring of the first bearing press-fitted into the indent.

With the use of the pair of circlips (the first circlip and the second circlip) sandwiching the inner ring of the first bearing, too, the first bearing is restrained from moving along the thrust direction relative to the crank shaft. The structure of the first circlip and the second circlip does not require the first bearing to be press-fitted to the crank shaft, thus providing an advantage of improved workability during assembly. In the structure of the first circlip and the second circlip, restriction of movement of the first bearing relative to the housing may be achieved by virtue of the outer ring of the first bearing being press-fitted into the indent of the housing. In the case where restriction of movement is achieved in this manner, the movement restricting structure is complete within a region where the outer ring of the first bearing is press-fitted into the indent of the housing. As a result, in a region which is located inside of that region, some play is provided to permit relative rotation between elements which are disposed coaxially with the crank shaft. In the structure in which the outer ring of the first bearing is press-fitted, the absence of a need for a fastener also provides an advantage in that control of the tightening torque is unnecessary.

According to a preferred embodiment of the present invention, the outer ring of the first bearing includes an inner peripheral surface, an outer peripheral surface, and a first end surface and a second end surface that connect the inner peripheral surface and the outer peripheral surface to each other; the first end surface of the outer ring of the first bearing is located farther outward in the right-left direction of the bicycle than is the second end surface of the outer ring of the first bearing; and the drive unit further includes a third circlip which abuts with the second end surface of the outer ring of the first bearing.

The third circlip abutting with the second end surface of the outer ring of the first bearing better prevents the first bearing, which has been press-fitted to the housing, from becoming detached.

According to a preferred embodiment of the present invention, the housing includes an indent into which the outer ring of the first bearing is press-fitted; and the movement restricting structure includes the indent of the housing and the outer ring of the first bearing press-fitted to the indent.

Restriction of movements of the first bearing is achieved suitably by virtue of the inner ring of the first bearing being press-fitted to the crank shaft and by virtue of the outer ring of the first bearing being press-fitted into the indent of the housing. Using such a structure provides an advantage in that no additional members are needed to restrict movement.

According to a preferred embodiment of the present invention, a drive unit to be mounted to a body frame of an electrically assisted bicycle to generate a driving power which is transmitted to a wheel of the electrically assisted bicycle includes a housing; a motor accommodated in the housing; a crank shaft extending through the housing along a right-left direction of the bicycle; and a pair of bearings rotatably supporting the crank shaft within the housing, each of the pair of bearings including an inner ring and an outer ring, wherein, the pair of bearings define a first bearing which is provided at one side along a thrust direction and a second bearing which is provided at another side along the thrust direction, the thrust direction corresponding to an axial direction of the crank shaft; the outer ring of the first bearing or the second bearing includes an inner peripheral surface, an outer peripheral surface, and a first end surface and a second end surface that connect the inner peripheral surface and the outer peripheral surface to each other; the first end surface is located farther outward in the right-left direction of the bicycle than is the second end surface; the housing includes an opposing portion that is opposed to the first end surface of the outer ring; and the drive unit further includes an elastic member which is provided between the first end surface of the outer ring and the opposing portion of the housing, the elastic member urging the outer ring inwardly along the right-left direction of the bicycle.

In the above-described drive unit, an elastic member which urges the outer ring inwardly along the bicycle's right-left direction is provided between the first end surface of the outer ring of the first bearing or the second bearing and the opposing portion (i.e., a portion opposed to the first end surface) of the housing. Since the elastic member inwardly urges the outer ring of the first bearing or the second bearing, the crank shaft is inwardly urged. As a result, rattling of the crank shaft is significantly reduced or prevented. Since the elastic member has a moderate elasticity, relative rotation between elements that are disposed coaxially with the crank shaft is possible.

According to a preferred embodiment of the present invention, the elastic member includes a corrugated washer.

As the elastic member, a corrugated washer, for example, is suitable.

An electrically assisted bicycle according to a preferred embodiment of the present invention includes a drive unit as described above.

When the electrically assisted bicycle includes a drive unit according to a preferred embodiment of the present invention, rattling of the crank shaft is significantly reduced or prevented so that a user who is accustomed to the traditional bicycle will feel less of an abnormality.

According to preferred embodiments of the present invention, drive units and electrically assisted bicycles in which rattling of the crank shaft is significantly reduced or prevented are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, with reference to the drawings, preferred embodiments of the present invention will be described. Note that the present invention is not limited to the following preferred embodiments.

Figure 1:
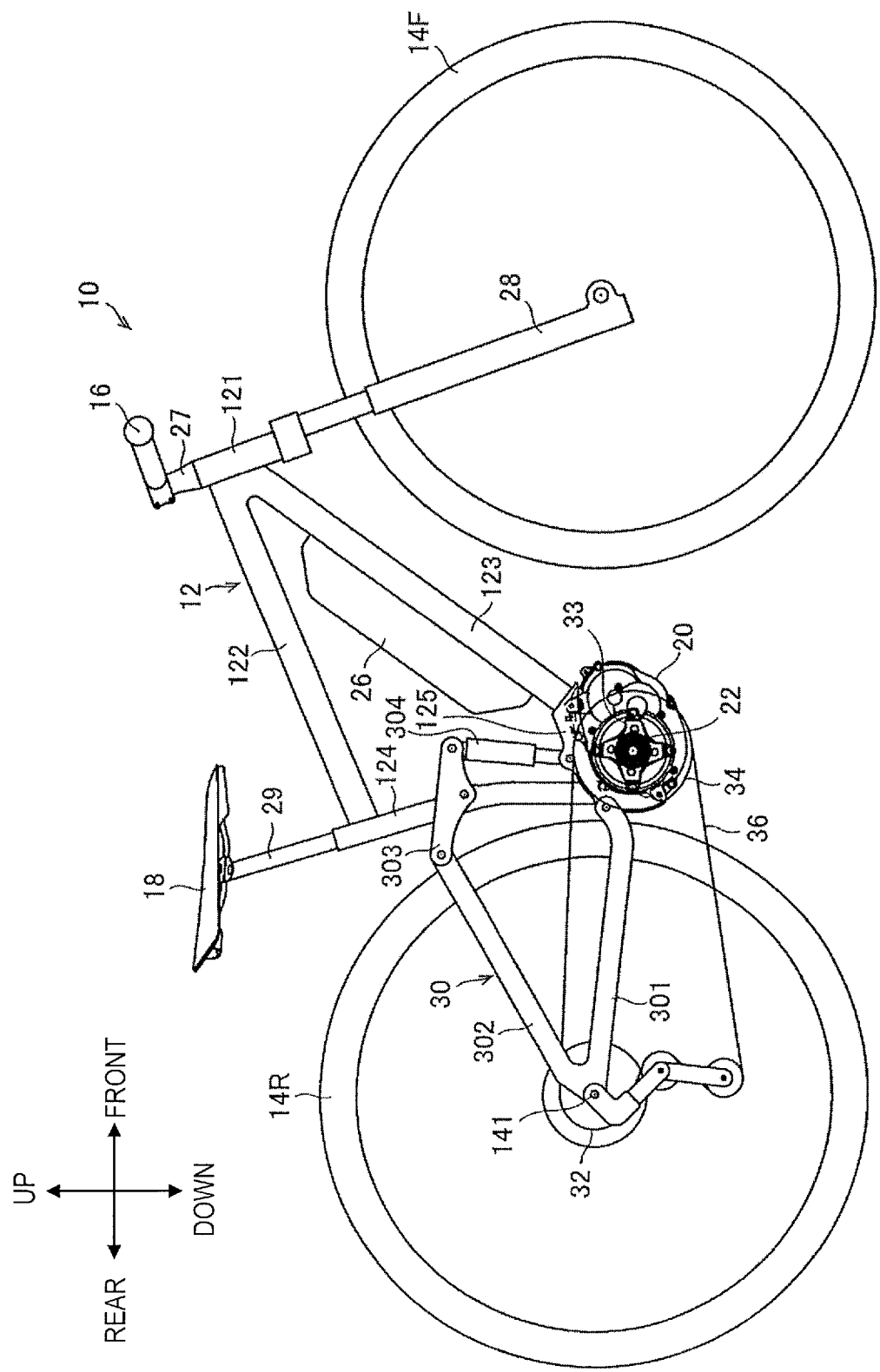
FIG. 1 is a right side view showing an electrically assisted bicycle 10 according to a preferred embodiment of the present invention.

With reference to FIG. 1, an electrically assisted bicycle 10 according to a preferred embodiment of the present invention will be described. FIG. 1 is a right side view showing the schematic structure of the electrically assisted bicycle 10.

In the following description, the terms "front", "rear", "right", "left", "up", and "down" respectively refer to the front, rear, right, left, up, and down as viewed from a rider (driver) who sits on a saddle 18 while gripping a handle bar 16.

The electrically assisted bicycle 10 includes a body frame 12, a front wheel 14F, a rear wheel 14R, the handle bar 16, and the saddle 18. The electrically assisted bicycle 10 further includes a drive unit 20 and a battery unit 26.

The body frame 12 includes a head tube 121, a top tube 122, a down tube 123, a seat tube 124, and a bracket 125.

The head tube 121, extending along the up-down direction, is disposed at the front of the body frame 12. A stem 27 is inserted in the head tube 121 so as to be rotatable therein. The handle bar 16 is fixed at the upper end of the stem 27. Front forks 28 are fixed at the lower end of the stem 27. At the lower end of the front forks 28, the front wheel 14F is mounted so as to be rotatable. In other words, the front wheel 14F is supported by the body frame 12 via the stem 27 and the front forks 28.

The top tube 122, extending along the front-rear direction, is disposed at the rear of the head tube 121. The front end of the top tube 122 is connected to the head tube 121. The rear end of the top tube 122 is connected to the seat tube 124.

The down tube 123, extending along the front-rear direction, is disposed at the rear of the head tube 121. The down tube 123 is disposed below the top tube 122. The front end of the down tube 123 is connected to the head tube 121. In the example shown in FIG. 1, the front end portion of the down tube 123 is also connected to the front end portion of the top tube 122. The rear end of the down tube 123 is connected to the bracket 125.

The battery unit 26 is mounted on the down tube 123. The battery unit 26 supplies electric power to the drive unit 20. The battery unit 26 includes a battery and a controller. The battery is a rechargeable battery that is able to be charged and discharged. The controller controls charging and discharging of the battery, and also monitors the output current, remaining power, etc., of the battery.

The seat tube 124, extending along the up-down direction, is disposed at the rear of the top tube 122 and the down tube 123. The lower end of the seat tube 124 is connected to the bracket 125. In other words, the seat tube 124 extends upward from the bracket 125.

In the preferred embodiment shown in FIG. 1, the seat tube 124 is bent at an intermediate portion along the up-down direction. As a result of this, a lower portion of the seat tube 124 extends along the up-down direction, while an upper portion of the seat tube 124 extends along a direction which is inclined with respect to the up-down direction.

A seat post 29 is inserted in the seat tube 124. The saddle 18 is mounted at the upper end of the seat post 29.

The bracket 125 is located at the lower end of the body frame 12. The bracket 125 supports the drive unit 20. The drive unit 20 mounted on the body frame 12 generates a driving power to be transmitted to a wheel (which herein is the rear wheel 14R). Details of the drive unit 20 will be described below.

The body frame 12 further includes a swingarm 30, a pair of connection arms 303, and a suspension 304. The swingarm 30 includes a pair of chain stays 301 and a pair of seat stays 302.

The pair of chain stays 301 each extend along the front-rear direction. The pair of chain stays 301 are disposed side-by-side along the right-left direction. The rear wheel 14R is disposed between the pair of chain stays 301. The pair of chain stays 301 are disposed symmetrically in the right-left direction. For this reason, FIG. 1 only illustrates the right chain stay 301.

The front end portion of each chain stay 301 is mounted to the bracket 125. In other words, each chain stay 301 extends rearward from the bracket 125. Each chain stay 301 is able to swing with respect to the bracket 125 around an axis which extends along the right-left direction.

A wheel axis 141 of the rear wheel 14R is mounted at the rear end portion of each chain stay 301 in such a manner that the wheel axis 141 itself is not able to rotate. In other words, the pair of chain stays 301 together support the rear wheel 14R in such a manner that the rear wheel 14R rotates around the wheel axis 141. That is, the rear wheel 14R is supported on the body frame 12. A plurality of driven sprocket wheels 32 are fixed on the rear wheel 14R.

The pair of seat stays 302 each extend along the front-rear direction. The pair of seat stays 302 are disposed side-by-side along the right-left direction. The rear wheel 14R is disposed between the pair of seat stays 302. The pair of seat stays 302 are disposed symmetrically in the right-left direction. For this reason, FIG. 1 only illustrates the right seat stay 302.

The rear end portion of the left seat stay 302 is connected to the rear end portion of the left chain stay 301. The rear end portion of the right seat stay 302 is connected to the rear end portion of the right chain stay 301.

The pair of connection arms 303 each extend along the front-rear direction. The pair of connection arms 303 are disposed side-by-side along the right-left direction. The seat tube 124 is disposed between the pair of connection arms 303. The pair of connection arms 303 are disposed symmetrically in the right-left direction. For this reason, FIG. 1 only illustrates the right connection arm 303.

Each connection arm 303 is mounted on the seat tube 124. Each connection arm 303 is able to swing with respect to the seat tube 124 around an axis which extends along the right-left direction.

As viewed from a side of the vehicle, the front end of each connection arm 303 is located forward of the seat tube 124. As viewed from a side of the vehicle, the rear end of each connection arm 303 is located rearward of the seat tube 124.

The rear end portion of the left connection arm 303 is mounted at the front end portion of the left seat stay 302. The left connection arm 303 is able to swing with respect to the left seat stay 302 around an axis which extends along the right-left direction.

The rear end portion of the right connection arm 303 is mounted at the front end portion of the right seat stay 302. The right connection arm 303 is able to swing with respect to the right seat stay 302 around an axis which extends along the right-left direction.

The suspension 304 is disposed forward of the seat tube 124 and rearward of the down tube 123. The upper end portion of the suspension 304 is mounted on the pair of connection arms 303. The suspension 304 is able to swing with respect to the pair of connection arms 303 around an axis which extends along the right-left direction. The lower end portion of the suspension 304 is mounted on the bracket 125. The suspension 304 is able to swing with respect to the bracket 125 around an axis which extends along the right-left direction. The location at which the suspension 304 is mounted to the bracket 125 is forward of the location at which the seat tube 124 is mounted to the bracket 125.

A drive sprocket wheel 34 is mounted on the drive unit 20 via a supporting member 33. A chain 36 is wound around the drive sprocket wheel 34 and the driven sprocket wheels 32.

Figure 2:
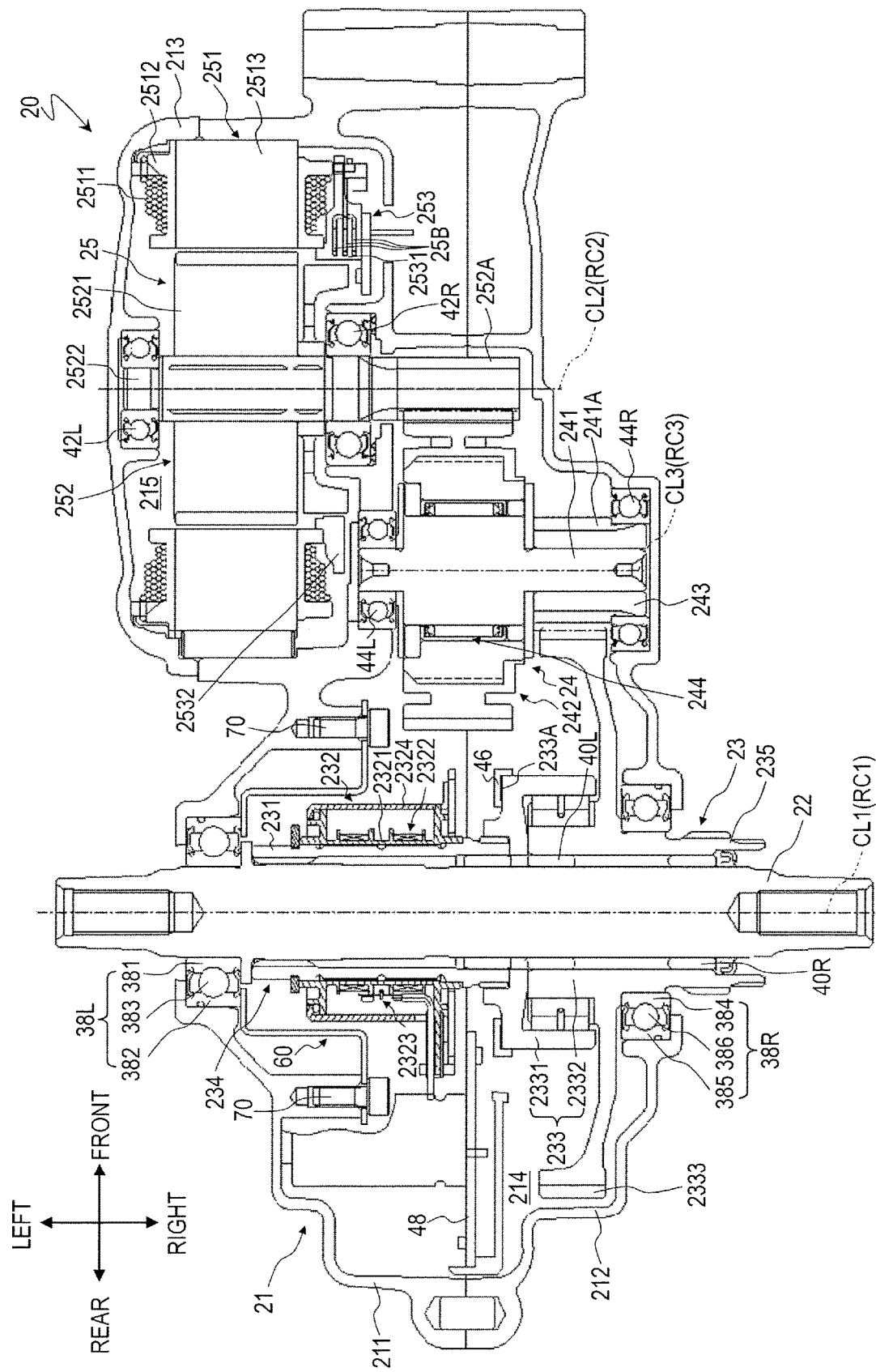
FIG. 2 is a cross-sectional view showing the internal structure of a drive unit 20 in the electrically assisted bicycle 10.

With reference to FIG. 2, the structure of the drive unit 20 will be described. FIG. 2 is a cross-sectional view showing the internal structure of the drive unit 20.

As shown in FIG. 2, the drive unit 20 includes a housing 21, a crank shaft 22, a rotary shaft 23, a speed reducer 24, and a motor 25.

The housing 21 is fixed to the bracket 125 by a plurality of fasteners, for example. The housing 21 includes a first housing member 211, a second housing member 212, and a cover 213. The first housing member 211, the second housing member 212, and the cover 213 are each preferably made of a metal material (e.g., an aluminum alloy).

In terms of the right-left direction, the first housing member 211 is overlaid on the second housing member 212 from the left. In this state, the first housing member 211 is fixed to the second housing member 212 by a plurality of fasteners, for example. As a result, a space 214 is created between the first housing member 211 and the second housing member 212.

In terms of the right-left direction, the cover 213 is overlaid on the first housing member 211 from the left. In this state, the cover 213 is fixed to the first housing member 211 by a plurality of fasteners, for example. As a result, on the outside (i.e., the left side) of the first housing member 211, a space 215 that is covered by the cover 213 is created.

The crank shaft 22 extends through the housing 21 along the vehicle's right-left direction. In other words, the center axis CL1 of the crank shaft 22 extends along the right-left direction. As viewed along the axial direction (thrust direction) of the crank shaft 22, the center axis CL1 defines the center of gyration RC1 of the crank shaft 22. The crank shaft 22 rotates with respect to the housing 21 around the center axis CL1.

The crank shaft 22 is rotatably supported by a pair of bearings 38L and 38R within the housing 21. One (38L) of the pair of bearings 38L and 38R (hereinafter referred to as the "first bearing") is disposed at one side along the thrust direction (which herein is the left side). On the other hand, the other (38R) of the pair of bearings 38L and 38R (hereinafter referred to as the "second bearing") is disposed at the other side (which herein is the right side) along the thrust direction.

The first bearing 38L is, for example, a roller bearing that includes an inner ring 381, an outer ring 382, and a rolling element 383. The first bearing 38L is disposed so as not to move along the thrust direction relative to the crank shaft 22. In the example shown in FIG. 2, the inner ring 381 of the first bearing 38L is press-fitted to the crank shaft 22.

The second bearing 38R is also, for example, a roller bearing that includes an inner ring 384, an outer ring 385, and a rolling element 386. The second bearing 38R rotatably supports the crank shaft 22 via a driven member 2332 of a one-way clutch 233 and plain bearings 40L and 40R, which will be described below.

The crank shaft 22 extends through the rotary shaft 23. The rotary shaft 23 is accommodated in the housing 21. Details of the rotary shaft 23 will be described below. The crank shaft 22 includes a pair of right and left crank arms (not shown) mounted thereto. Pedals (not shown) are mounted on the crank arms.

The motor 25 is accommodated in the housing 21. The motor 25 generates a driving power which assists the travel of the electrically assisted bicycle 10. The motor 25 includes a stator 251 and a rotor 252.

The stator 251 includes a plurality of (e.g., fourteen) bobbins 2512, around which coils 2511 are wound. An iron core 2513 is inserted in each bobbin 2512. The stator 251 is disposed in the space 215. In this state, the stator 251 is fixed to the first housing member 211.

A supporting member 253 is mounted on the stator 251. The supporting member 253 is preferably made of a resin material. A plurality of busbars 25B are embedded in the supporting member 253. Each busbar 25B is connected to a corresponding coil 2511. By controlling power to the busbars 25B, a magnetic force is generated in the stator 251.

The supporting member 253 is preferably annular shaped. Along the axial direction of the rotor 252, the supporting member 253 is located closer to the second housing member 212 than is the stator 251. The supporting member 253 includes an embedded portion 2531 at which the busbars 25B are embedded and a non-embedded portion 2532 at which no busbars 25B are embedded.

The rotor 252 is disposed inside the stator 251. The center axis CL2 of the rotor 252 is parallel or substantially parallel to the center axis CL1 of the crank shaft 22. In other words, the rotor 252 is disposed parallel or substantially parallel to the crank shaft 22. As viewed along the axial direction of the crank shaft 22, the center axis CL2 defines the center of gyration RC2 of the rotor 252.

The rotor 252 includes a rotor main body 2521 and an output shaft 2522. These will now be described.

The outer peripheral surface of the rotor main body 2521 is alternately magnetized into N-poles and S-poles along the peripheral direction. In the present preferred embodiment, there are seven N-poles and seven S-poles, for example.

The output shaft 2522 extends through the rotor main body 2521. The output shaft 2522 is fixed to the rotor main body 2521. In other words, the output shaft 2522 rotates together with the rotor main body 2521.

By two bearings 42L and 42R, the output shaft 2522 is supported to rotate relative to the housing 21 around the center axis CL2. The bearing 42L is fixed to the cover 213. The bearing 42R is disposed farther toward the right side (i.e., toward the other end of the axial direction) than is the rotor main body 2521, and is fixed to the first housing member 211.

The output shaft 2522 extends through the first housing member 211. In a portion of the output shaft 2522 that is located in the space 214, an output gear 252A is provided. The output gear 252A is preferably a helical gear.

The speed reducer 24 is accommodated in the housing 21. Specifically, the speed reducer 24 is disposed within the space 214. The speed reducer 24 includes a transmission shaft 241, a first transmission gear 242, and a second transmission gear 243.

The transmission shaft 241 is disposed in the housing 21. The center axis CL3 of the transmission shaft 241 is parallel or substantially parallel to the center axis CL1 of the crank shaft 22. In other words, the transmission shaft 241 extends parallel or substantially parallel to the center axis CL1 of the crank shaft 22. As viewed along the axial direction of the transmission shaft 241, i.e., the axial direction of the crank shaft 22, the center axis CL3 defines the center of gyration RC3 of the transmission shaft 241.

By two bearings 44L and 44R, the transmission shaft 241 is supported so as to be rotatable around the center axis CL3. The bearing 44L is fixed to the first housing member 211. The bearing 44R is fixed to the second housing member 212.

The first transmission gear 242 is preferably made of a resin material. The first transmission gear 242 is disposed on the transmission shaft 241. The first transmission gear 242 is disposed closer to the bearing 44L than to the bearing 44R along the axial direction of the transmission shaft 241. The first transmission gear 242 meshes with the output gear 252A. As a result, a driving power which is generated by the motor 25 is transmitted from the output gear 252A to the first transmission gear 242. Between the first transmission gear 242 and the transmission shaft 241, a one-way clutch 244 is provided. As a result, the rotary force of the output gear 252A in the forward-rotation direction is transmitted to the transmission shaft 241 via the first transmission gear 242, while the rotary force of the output gear 252A in the backward-rotation direction is not transmitted to the transmission shaft 241. The first transmission gear 242 is larger in diameter than the output gear 252A and has more teeth than does the output gear 252A. In other words, the speed of the first transmission gear 242 is slower than that of the output gear 252A.

The second transmission gear 243 is preferably made of a metal material (e.g., iron). The second transmission gear 243 is disposed on the transmission shaft 241. The second transmission gear 243 is disposed at a different position from the first transmission gear 242 along the axial direction of the transmission shaft 241. The second transmission gear 243 is fixed to the transmission shaft 241 via a serration coupling (or press-fitting). In other words, the second transmission gear 243 rotates together with the transmission shaft 241.

The rotary shaft 23 is disposed coaxially with the crank shaft 22, and is able to rotate with the crank shaft 22. The rotary shaft 23 includes a connecting shaft 231 and a one-way clutch 233.

The connecting shaft 231 preferably has a cylindrical shape. The crank shaft 22 is inserted in the connecting shaft 231. The connecting shaft 231 is disposed coaxially with the crank shaft 22.

The left end (or one end along the axial direction) of the connecting shaft 231 is linked to the crank shaft 22 via a serration coupling or the like. As a result, regardless of whether the crank shaft 22 rotates in the forward-rotation direction or the backward-rotation direction, the connecting shaft 231 rotates together with the crank shaft 22.

A torque detector 232 is provided around the connecting shaft 231. The torque detector 232 is supported by the first housing member 211.

The torque detector 232 detects a torque that occurs in the connecting shaft 231 as the driver moves the pedals. The torque detector 232 is preferably a torque sensor of the magnetostrictive type, for example. The torque detector 232 is disposed around the connecting shaft 231. The torque detector 232 outputs the detected torque signal to a controller which is mounted on the circuit board 48. By referring to the torque signal which has been detected by the torque detector 232, the controller knows the state of pedaling by the driver, and thus controls the motor 25.

The torque detector 232 includes an attachment shaft 2321, a coil 2322, a detection element 2323, and a shield 2324.

The attachment shaft 2321 is mounted on the outer peripheral surface of the connecting shaft 231, and is able to relatively rotate with respect to the connecting shaft 231. The coil 2322 is disposed on the outer peripheral surface of the attachment shaft 2321. A predetermined voltage is applied to the coil 2322. The detection element 2323 detects a change in voltage of the coil 2322 that is caused by distortion of the connecting shaft 231. As a result, a torque occurring in the connecting shaft 231, i.e., a torque occurring in the crank shaft 22 rotating integrally with the connecting shaft 231, is detected. The shield 2324 prevents the detection accuracy of the detection element 2323 (i.e., the accuracy with which a change in voltage of the coil 2322 is detected) from being deteriorated by an external magnetic field. The shield 2324 is engaged with a stopper 236 (see FIG. 3) provided on the housing 21 (or specifically, the first housing member 211). In other words, the shield 2324 does not rotate with the connecting shaft 231.

Along the axial direction of the crank shaft 22, the one-way clutch 233 is disposed closer to the second housing member 212 than is the torque detector 232. The one-way clutch 233 is disposed coaxially with the crank shaft 22. The one-way clutch 233 includes a driving member 2331 and a driven member 2332.

The driving member 2331 preferably has a cylindrical shape. At the left end (i.e., the one end along the axial direction) of the driving member 2331, the right end (i.e., the other end along the axial direction) of the connecting shaft 231 is inserted. The driving member 2331 is disposed coaxially with the connecting shaft 231. In this state, the right end (i.e., the other end along the axial direction) of the connecting shaft 231 is linked to the left end (i.e., the one end along the axial direction) of the driving member 2331 via a serration coupling or the like. As a result, regardless of whether the connecting shaft 231 rotates in the forward-rotation direction or the backward-rotation direction, the driving member 2331 rotates together with the connecting shaft 231. In other words, regardless of whether the crank shaft 22 rotates in the forward-rotation direction or the backward-rotation direction, the driving member 2331 rotates together with the crank shaft 22. The connecting shaft 231 and the driving member 2331 function as a crank rotation inputting shaft 234 that rotates integrally with the crank shaft 22.

On the outer peripheral surface of the driving member 2331, an annular attachment surface 233A is provided. The attachment surface 233A extends in the radial direction of the driving member 2331, and along the peripheral direction. The attachment surface 233A is located farther to the right side (i.e., toward the other end of axial direction) than to the left end (i.e., the one end along the axial direction) of the driving member 2331. As viewed along the axial direction of the crank shaft 22, the attachment surface 233A is at a location that overlaps a portion of the circuit board 48.

A ring magnet 46 is fixed to the attachment surface 233A. As viewed along the axial direction of the crank shaft 22, the ring magnet 46 is at a location that overlaps the driving member 2331. As viewed along the axial direction of the crank shaft 22, the ring magnet 46 is at a location that overlaps a portion of the circuit board 48.

The ring magnet 46 rotates together with the driving member 2331. Therefore, by using a detection element 48A (see FIG. 3) provided on the circuit board 48 to detect a change in the magnetic field that is caused by the rotation of the ring magnet 46, rotation of the driving member 2331 (i.e., the crank shaft 22) is detected. In other words, a rotation detector is defined by the ring magnet 46 and the detection element 48A.

The detection element 48A is mounted on the circuit board 48. The detection element 48A is disposed at a position that is opposed to the ring magnet 46 along the axial direction of the crank shaft 22.

The driven member 2332 preferably has a cylindrical shape. The crank shaft 22 is inserted in the driven member 2332. The plain bearings 40L and 40R are disposed between the driven member 2332 and the crank shaft 22. As a result of this, the driven member 2322 rotates coaxially with the crank shaft 22.

The left end (i.e., the one end along the axial direction) of the driven member 2332 is inserted at the right end (i.e., the other end along the axial direction) of the driving member 2331. Between the left end (i.e., the one end along the axial direction) of the driven member 2332 and the right end (i.e., the other end along the axial direction) of the driving member 2331, a ratchet mechanism as a one-way clutch mechanism is provided. As a result, a rotary force of the driving member 2331 in the forward-rotation direction is transmitted to the driven member 2332, while the rotary force of the driving member 2331 in the backward-rotation direction is not transmitted to the driven member 2332.

The driven member 2332 is supported by the second bearing 38R so as to be rotatable relative to the housing 21 around the center axis CL1 of the crank shaft 22. The outer ring 385 of the second bearing 38R is free-fitted to the second housing member 212, with the inner ring 384 thereof being press-fitted to the driven member 2332 of the one-way clutch 233.

The driven member 2332 extends through the housing member 212. The drive sprocket wheel 34 (see FIG. 1) is mounted to a portion of the driven member 2332 that is located outside (i.e., on the right side of) the housing 21, via the supporting member 33 (see FIG. 1).

The driven member 2332 includes a gear 2333. The gear 2333 meshes with a gear 241A of the speed reducer 24. The gear 2333 is larger in diameter than the gear 241A, and has more teeth than does the gear 241A. That is, the rotational speed of the gear 2333 is slower than the rotational speed of the gear 241A.

With the driven member 2332, a resultant force outputting shaft 235 which outputs a resultant force combining a human force (pedaling force) which is input via the one-way clutch 233 and a motor driving power which is input via the gear 2333 is realized. In other words, the resultant force outputting shaft 235 is included in the rotary shaft 23.

Figure 3:
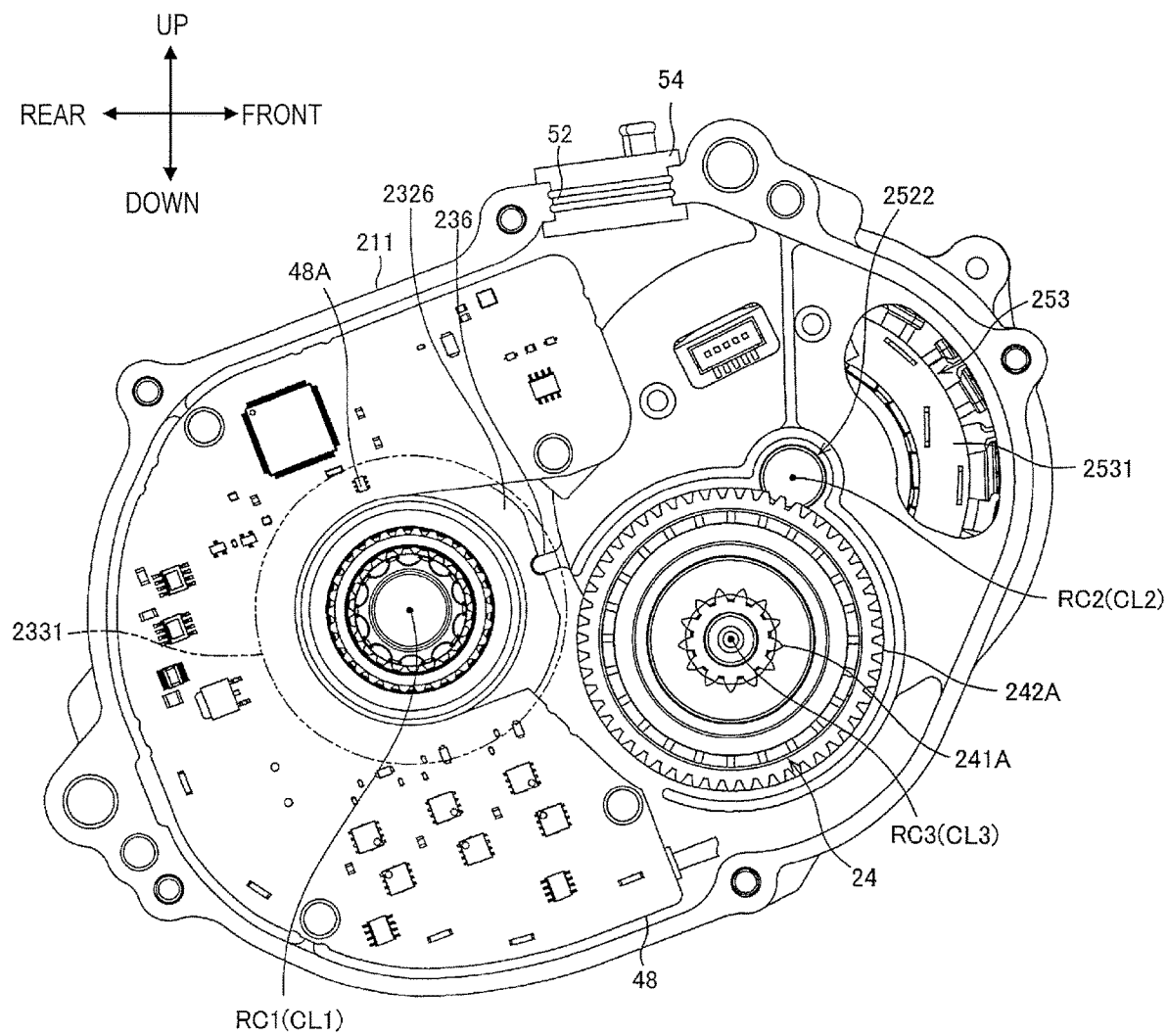
FIG. 3 is a right side view showing the internal structure of the drive unit 20, with a right housing member (second housing member 212) and a one-way clutch 233 being removed.

With reference to FIG. 3, the circuit board 48 disposed in the housing 21 will be described. FIG. 3 is a right side view showing the internal structure of the drive unit 20, with the second housing member 212 and the one-way clutch 233 being removed. FIG. 3 illustrates the driving member 2331 with an imaginary line.

The circuit board 48 controls the supply of electric power to the motor 25. The circuit board 48 surrounds the crank shaft 22 as viewed along the axial direction of the crank shaft 22. In the example shown in FIG. 3, the circuit board 48 is preferably C-shaped or substantially C-shaped, as viewed along the axial direction of the crank shaft 22. As viewed along the axial direction of the crank shaft 22, the circuit board 48 does not overlap with the speed reducer 24.

An outlet 52, through which wiring lines that are connected to the circuit board 48 are taken out, is provided in the housing 21. In the present preferred embodiment, a grommet 54 is placed on the outlet 52. The grommet 54 is preferably an elastic body. The grommet 54 is provided for the purposes of protecting the wiring lines 50, and for being dust-proof and water-proof. The wiring lines that are connected to the circuit board 48 pass through the grommet 54 so as to be led outside of the drive unit 20. The wiring lines connected to the circuit board 48 are connected to the battery unit 26 (see FIG. 1).

The drive unit 20 including the above structure includes a movement restricting structure that restricts movement of one (i.e., the first bearing 38L) of the pair of bearings 38L and 38R that rotatably support the crank shaft 22. The movement restricting structure restricts movement of the first bearing 38L relative to the housing 21 along the thrust direction (i.e., the axial direction of the crank shaft 22).

Figure 4:
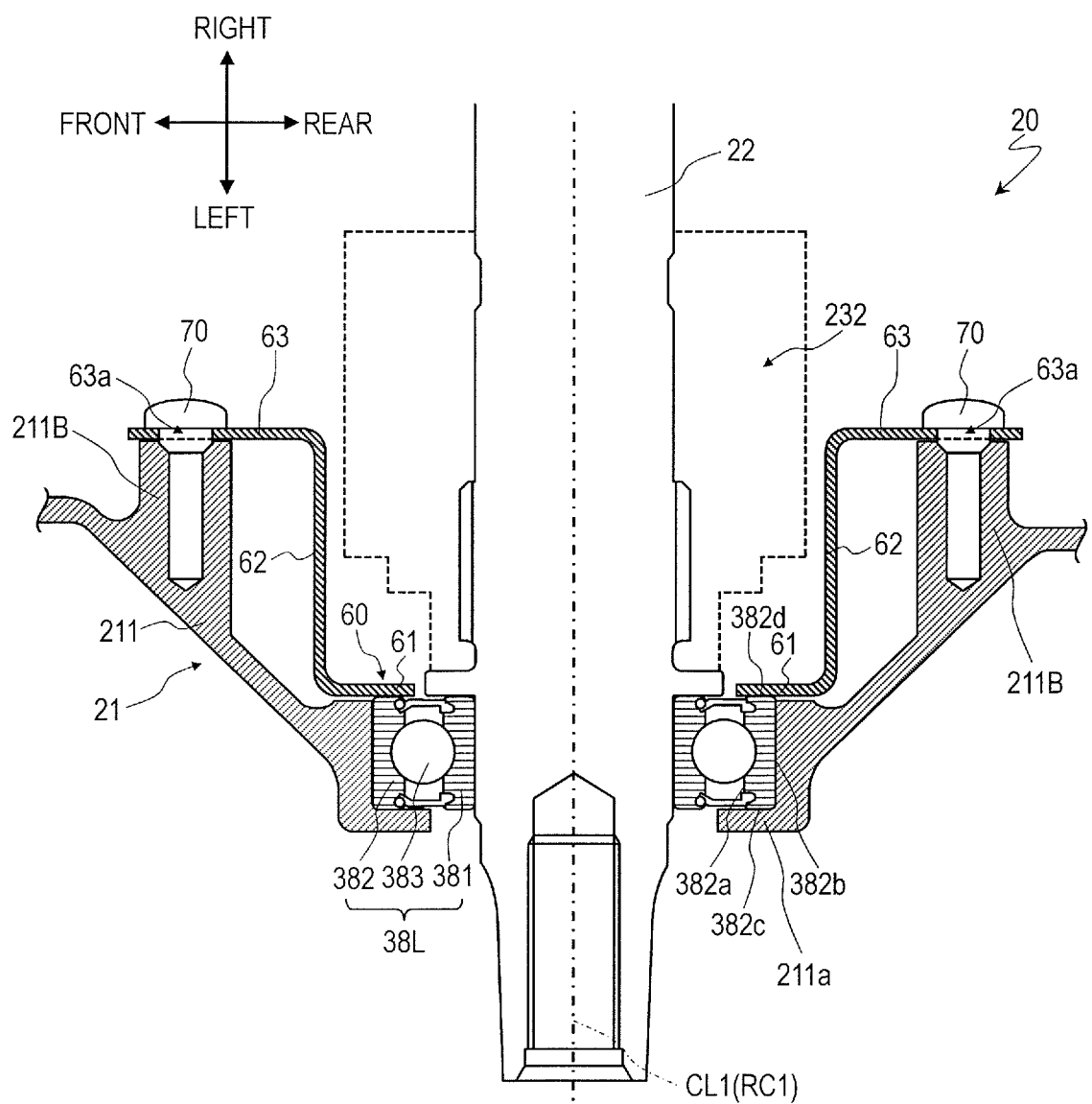
FIG. 4 is a cross-sectional view showing enlarged a portion (the vicinity of a first bearing 38L) of FIG. 2.

Hereinafter, with reference to FIG. 4, the movement restricting structure of the drive unit 20 will be specifically described. FIG. 4 is a cross-sectional view showing an enlarged vicinity of the first bearing 38L.

As has already been described, the inner ring 381 of the first bearing 38L is preferably press-fitted to the crank shaft 22. With the inner ring 381 being press-fitted to the crank shaft 22, the outer ring 382 of the first bearing 38L is free-fitted to the housing 21 (first housing member 211).

As shown in FIG. 4, the outer ring 382 of the first bearing 38L includes an inner peripheral surface 382a, an outer peripheral surface 382b, and a pair of axial end surfaces 382c and 382d that connect the inner peripheral surface 382a and the outer peripheral surface 382b to each other. Herein, one (382c) of the pair of axial end surfaces 382c and 382d is referred to as the "first end surface", while the other (382d) is referred to as the "second end surface". The first end surface 382c is located farther outward in the right-left direction than is the second end surface 382d.

The housing 21 (first housing member 211) includes a first abutment 211a that abuts with the first end surface 382c of the outer ring 382 of the first bearing 38L. The first abutment 211a preferably has an annular or substantially annular shape.

The movement restricting structure of the drive unit 20 includes the first abutment 211a of the housing 21. Moreover, the movement restricting structure further includes a plate-shaped member 60 that is fixed to the housing 21 (first housing member 211).

The plate-shaped member 60 includes a second abutment 61 that abuts with the second end surface 382d of the outer ring 382 of the first bearing 38L. Together with the first abutment 211a of the housing 21, the second abutment 61 sandwiches the outer ring 382 of the first bearing 38L. The plate-shaped member 60 is fixed to the housing 21 by a plurality of fasteners 70, for example. In the example shown in FIG. 4, the plurality of fasteners 70 include two bolts, for example, each of which is screwed into a boss 211B on the housing 21 (first housing member 211).

Figure 5:
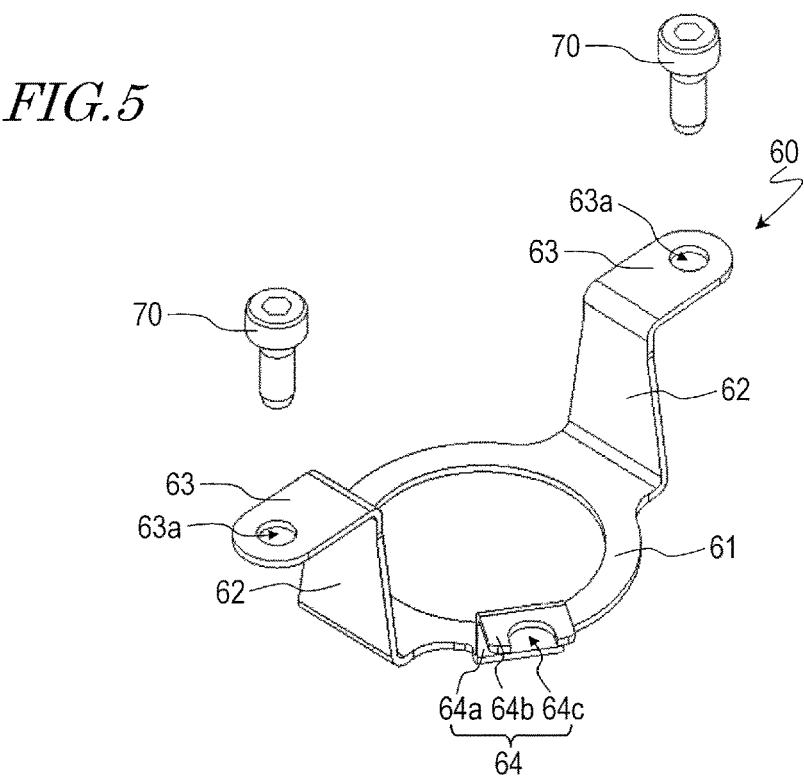
FIG. 5 is a perspective view showing a plate-shaped member 60 that is included in a movement restricting structure of the drive unit 20.
Figure 6:
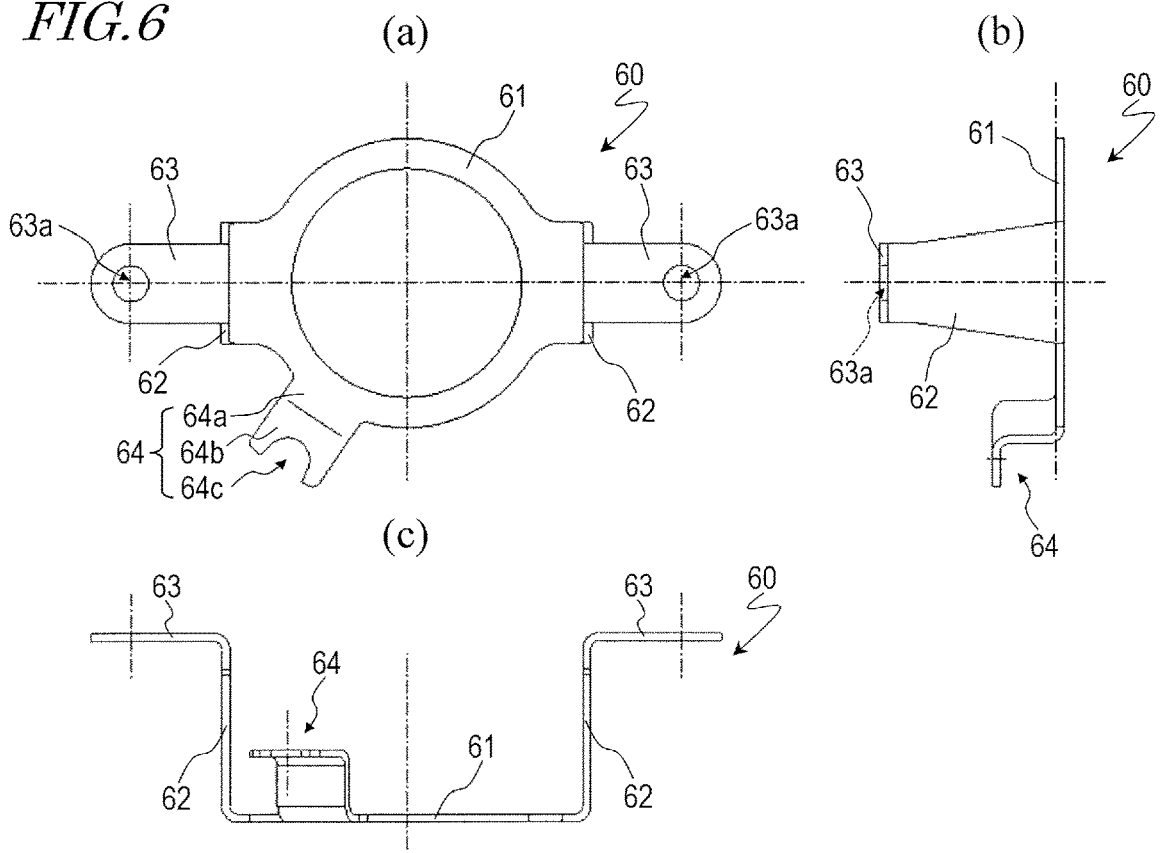
FIG. 6 includes: (a) an upper plan view showing a plate-shaped member 60; and (b) and (c) side views showing the plate-shaped member 60.
Figure 7:
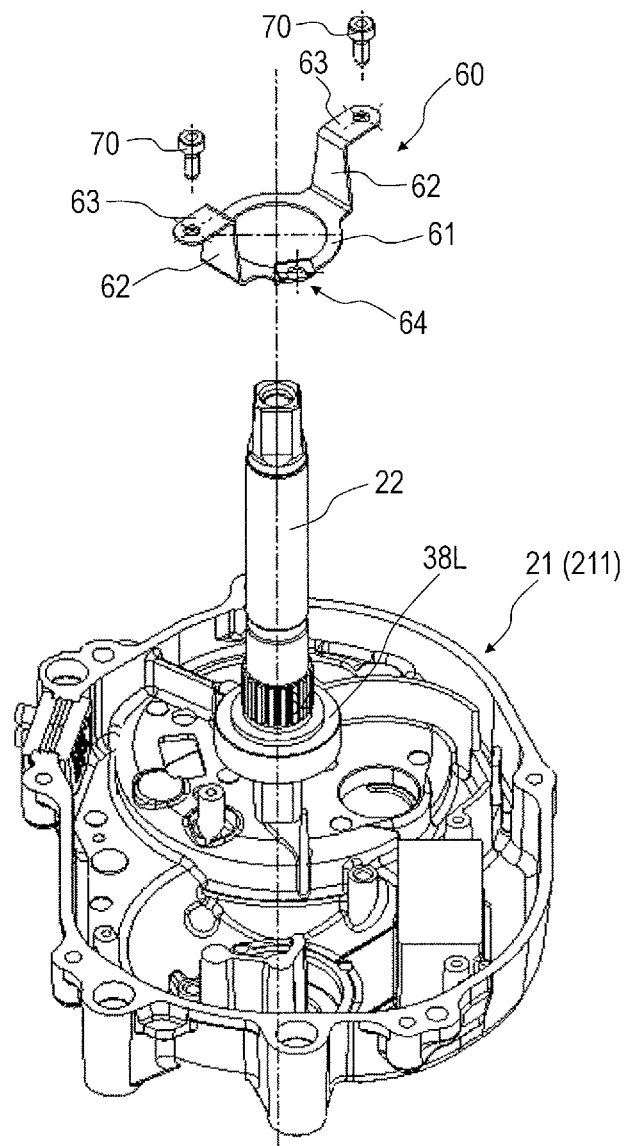
FIG. 7 is an exploded perspective view showing a first housing member 211, a crank shaft 22 to which the first bearing 38L has been press-fitted, the plate-shaped member 60, and fasteners 70.

Now, with reference also to FIGS. 5, 6, and 7, the structure of the plate-shaped member 60 will be described more specifically. FIG. 5 is a perspective view showing the plate-shaped member 60, in which the fasteners 70 are also shown. FIG. 6 includes (a) an upper plan view showing the plate-shaped member 60; and (b), (c) side views showing the plate-shaped member 60. FIG. 7 is an exploded perspective view showing the first housing member 211, the crank shaft 22 to which the first bearing 38L has been press-fitted, the plate-shaped member 60, and the fasteners 70.

As shown in FIG. 5 and the like, the plate-shaped member 60 includes the second abutment 61, a plurality of (e.g., two herein) connecting sections 62, and a plurality of (e.g., two herein) fastening sections 63.

The second abutment 61, which is preferably annular or substantially annular shaped, define the bottom of the plate-shaped member 60. The two connecting sections 62, each extending from the second abutment 61 along the thrust direction, connect the second abutment 61 with the two fastening sections 63. The two fastening sections 63 extend from the respectively corresponding connecting sections 62 in a direction that is perpendicular or substantially perpendicular to the thrust direction. Each fastening section 63 includes an aperture 63a through which the corresponding fastener 70 is inserted, such that the plate-shaped member 60 is fastened (fixed) to the housing 21 (first housing member 211) at the fastening sections 63.

In the example shown in FIG. 5 and the like, the plate-shaped member 60 further includes an alignment section 64. The alignment section 64 includes a first extension 64a that extends from the second abutment 61 in a direction which is inclined with respect to the thrust direction; a second extension 64b extending from the first extension 64a in a direction which intersects the first extension 64a; and a recess 64c provided in the second extension 64b. When fixing the plate-shaped member 60 to the housing 21 (first housing member 211), the recess 64c of the alignment section 64 is engaged with a predetermined portion of the first housing member 211 thus achieving alignment.

The plate-shaped member 60 is preferably made of a metal material. As the metal material, carbon tool steels or cold rolled steels for springs may be used, for example.

In the drive unit 20 according to a preferred embodiment of the present invention, with the above-described movement restricting structure, movements of the first bearing 38L relative to the housing 21 are restricted (controlled) along the thrust direction. The first bearing 38L is disposed so as not to move along the thrust direction relative to the crank shaft 22 (e.g., the inner ring 381 of the first bearing 38L may be press-fitted to the crank shaft 22). Thus, since the movement restricting structure restricts movement of the first bearing 38L, movements of the crank shaft 22 relative to the housing 21 are restricted (controlled) along the thrust direction. Therefore, according to a preferred embodiment of the present invention, rattling of the crank shaft 22 is significantly reduced or prevented.

Moreover, restriction of movements of the first bearing 38L is achieved as the first abutment 211a of the housing 21 and the second abutment 61 of the plate-shaped member 60 sandwich the outer ring 382 of the first bearing 38L. Stated otherwise, the movement restricting structure is complete within a region where the first abutment 211a of the housing 21 and the second abutment 61 of the plate-shaped member 60 are disposed. As a result, in the region which is located inside (i.e., the right side) of the plate-shaped member 60, some play is provided to permit relative rotation between elements which are disposed coaxially with the crank shaft 22 (i.e., the driving member 2331 and the driven member 2332 of the one-way clutch 233).

In the structure illustrated herein, the plate-shaped member 60 includes two fastening sections 63; however, the number of fastening sections 63 is not limited to two. The plate-shaped member 60 may be fixed by one fastening section 63, or by three or more fastening sections 63. From the standpoint of effectively restricting movement, it is preferable that there is a plurality (i.e., two or more) of the fastening sections 63. In the case where a plurality of fastening sections 63 are provided, it is preferable that the plurality of fastening sections 63 are disposed at location that divide the second abutment 61, which has an annular or substantially annular shape, into equal or substantially equal portions. For example, in the case where there are two fastening sections 63, the two fastening sections 63 are preferably disposed at locations that divide the second abutment 61 into two equal portions along the peripheral direction.

Figure 8:
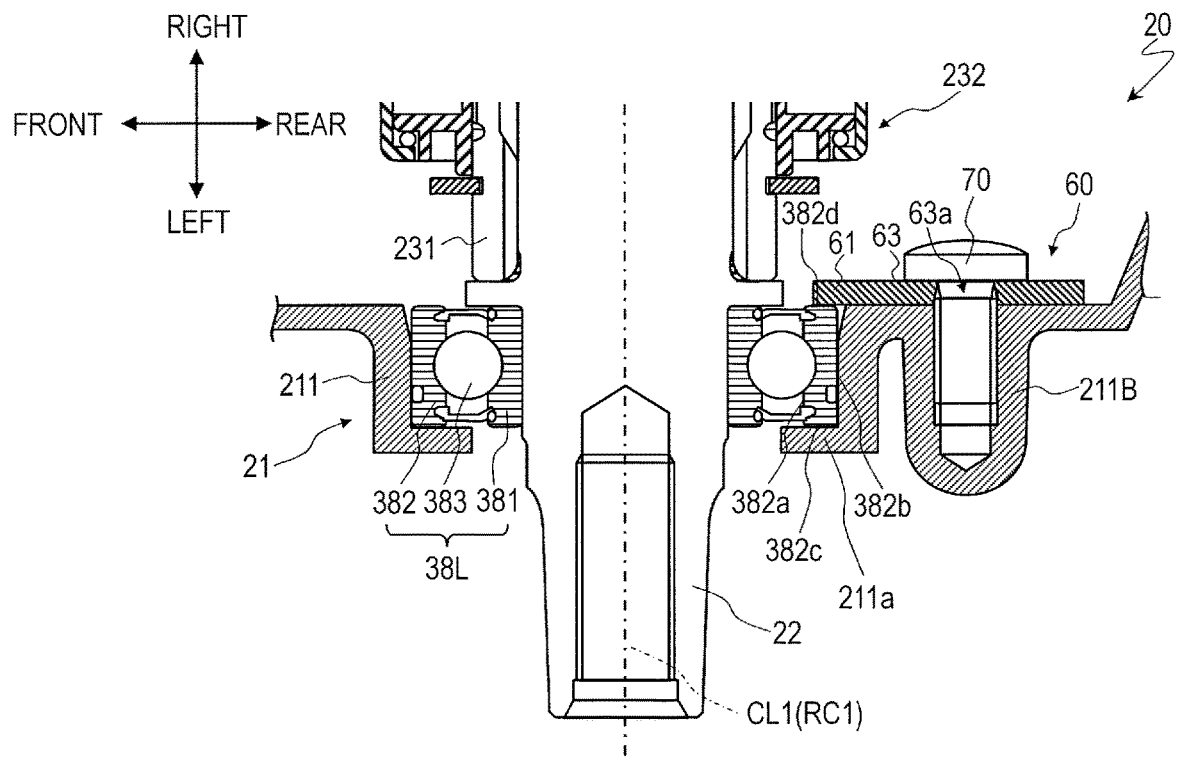
FIG. 8 is a cross-sectional view of another example of the movement restricting structure, showing enlarged the vicinity of the first bearing 38L.

FIG. 8 shows another example of the movement restricting structure. In the example shown in FIG. 8, the plate-shaped member 60 does not include the connecting sections 62, but a fastening section 63 is provided which is continuous with the second abutment 61. The example shown in FIG. 8 is illustrated as including only one fastening section 63.

As in the example shown in FIG. 8, a structure from which the connecting sections 62 are omitted may be used to suitably restrict movement of the first bearing 38L (i.e., of the crank shaft 22). Note that two or more fastening sections 63 may be provided in a structure where the connecting sections 62 are omitted.

Figure 9:
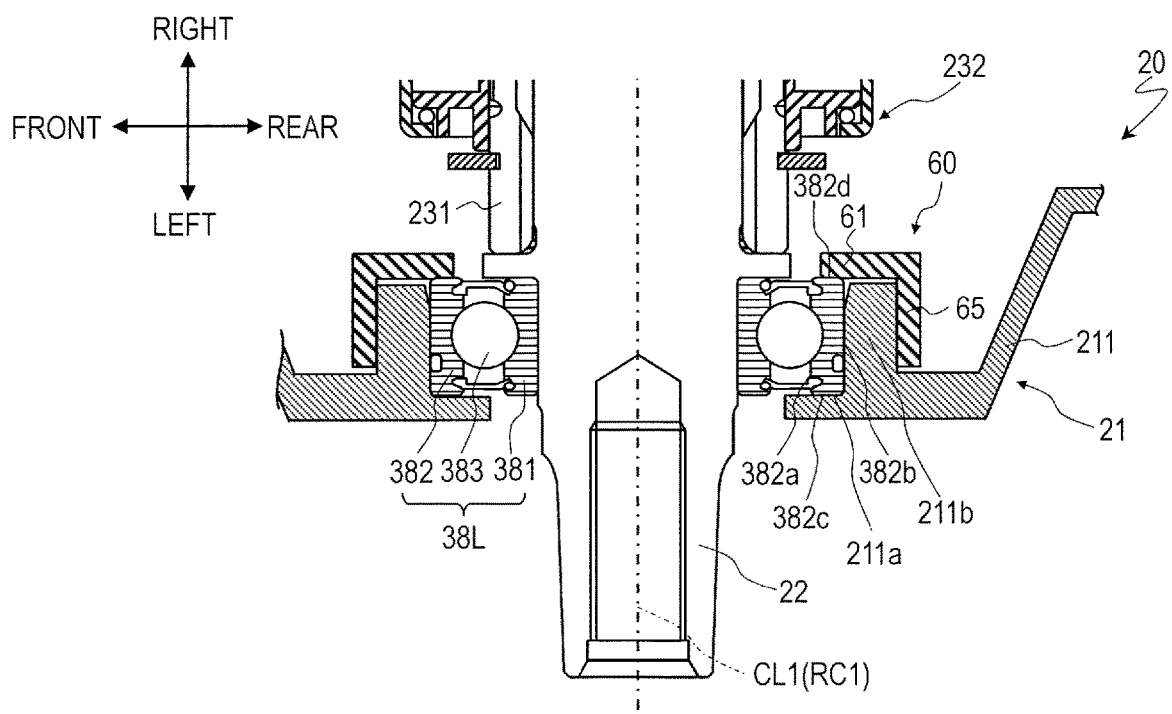
FIG. 9 is a cross-sectional view of still another example of the movement restricting structure, showing an enlarged vicinity of the first bearing 38L.

FIG. 9 shows still another example of the movement restricting structure. In the example shown in FIG. 9, the housing 21 (first housing member 211) includes a protrusion 211*b* which is continuous with the first abutment 211*a* and which protrudes along the thrust direction so as to surround the first bearing 38L. The plate-shaped member 60 includes a portion 65 extending along the thrust direction, the portion 65 being press-fitted onto the protrusion 211*b* of the housing 21. Hereinafter, the portion 65 may also be referred to as the "press-fit portion". The plate-shaped member 60 is fixed to the housing 21 by the press-fit portion 65.

As in the example shown in FIG. 9, a structure in which the plate-shaped member 60 is fixed to the housing 21 via press-fitting may be used to suitably restrict movement of the first bearing 38L (i.e., of the crank shaft 22).

In the example shown in FIG. 9, the portion 65 of the plate-shaped member 60 that extends along the thrust direction may not be press-fitted to the protrusion 211*b* of the housing 60 (and free-fitted, for example). Instead, the plate-shaped member 60 may be fastened to the protrusion 211*b* with a fastener(s).

Figure 10:
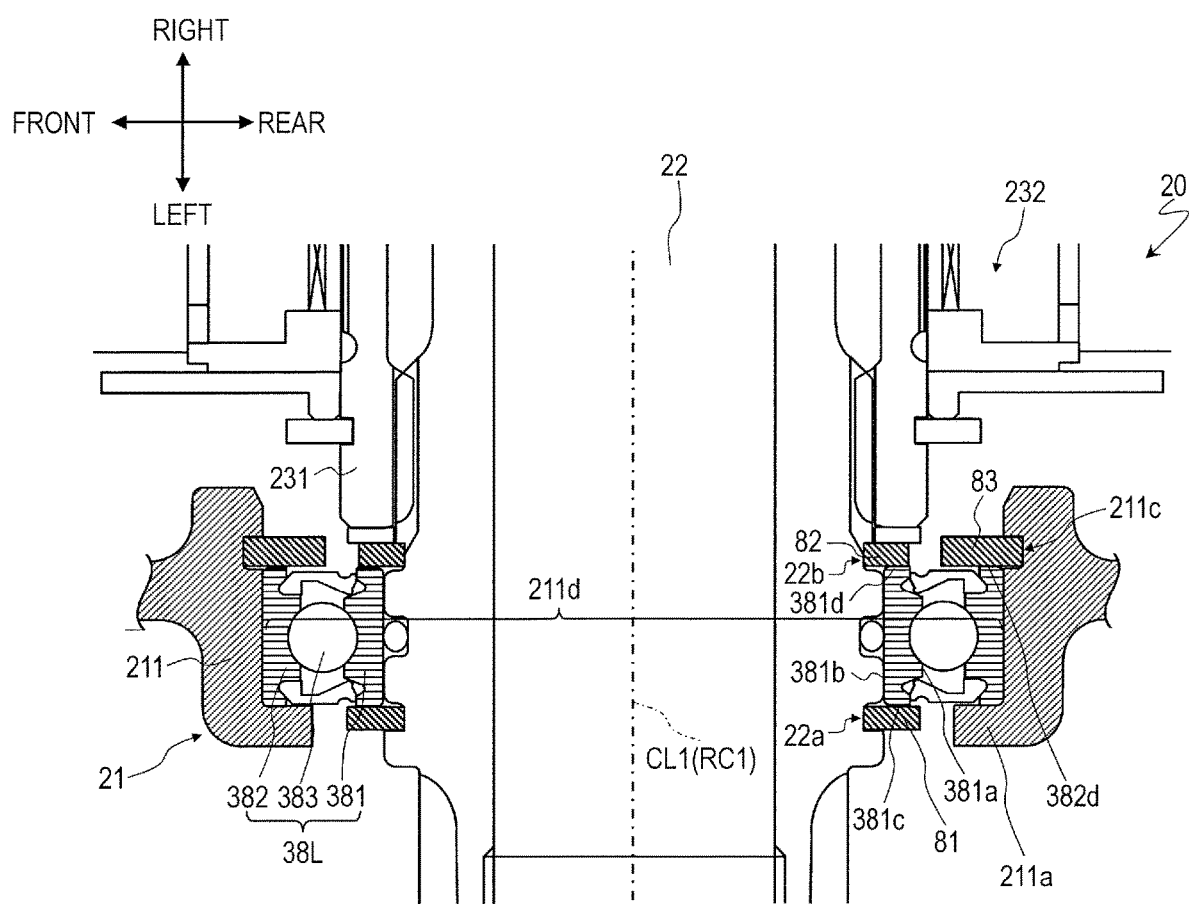
FIG. 10 is a cross-sectional view of still another example of the movement restricting structure, showing an enlarged vicinity of the first bearing 38L.

FIG. 10 shows still another example of the movement restricting structure. In the example shown in FIG. 10, the drive unit 20 further includes a pair of circlips (fixing rings) 81 and 82 that sandwich the inner ring 381 of the first bearing 38L. Hereinafter, these will be described more specifically.

The inner ring 381 of the first bearing 38L includes an inner peripheral surface 381*a*, an outer peripheral surface 381*b*, and a first end surface 381*c* and a second end surface 381*d* that connect the inner peripheral surface 381*a* and the outer peripheral surface 381*b* to each other. The first end surface 381*c* is located farther outward in the right-left direction than is the second end surface 381*d*.

The pair of circlips 81 and 82 are fitted in a groove 22*a* or indent 22*b* in the crank shaft 22. One (81) of the pair of circlips 81 and 82 (hereinafter referred to as the "first circlip") abuts with the first end surface 381*c* of the inner ring 381 of the first bearing 38L. The other (82) of the pair of circlips 81 and 82 (hereinafter referred to as the "second circlip") abuts with the second end surface 381*d* of the inner ring 381 of the first bearing 38L. The first circlip 81 and the second circlip 82 are preferably made of a metal material (e.g., a carbon steel or a stainless steel).

Since the pair of circlips 81 and 82 sandwich the inner ring 381 of the first bearing 38L, the first bearing 38L is disposed so as not to move along the thrust direction relative to the crank shaft 22.

Moreover, the outer ring 382 of the first bearing 38L is press-fitted into an indent 211*d* in the housing 21 (first housing member 211). In the example shown in FIG. 10, the movement restricting structure may be considered to include the indent 211*d* of the housing 21 and the outer ring 382 of the first bearing 38L press-fitted into the indent 211*d*.

The structure shown in FIG. 10 may be used to suitably restrict movement of the first bearing 38L (i.e., of the crank shaft 22).

In the example shown in FIG. 10, in addition to the first circlip 81 and the second circlip 82, a third circlip 83 is provided which abuts with the second end surface 382*d* of the outer ring 382 of the first bearing 38L. The third circlip 83 is fitted in a groove in the housing 21 (first housing member 211). The third circlip 83 and the first abutment 211*a* of the housing 21 sandwich the outer ring 382 of the first bearing 38L. The third circlip 83 better prevents the outer ring 382 having been press-fitted to the housing 21 from becoming detached.

Figure 11:
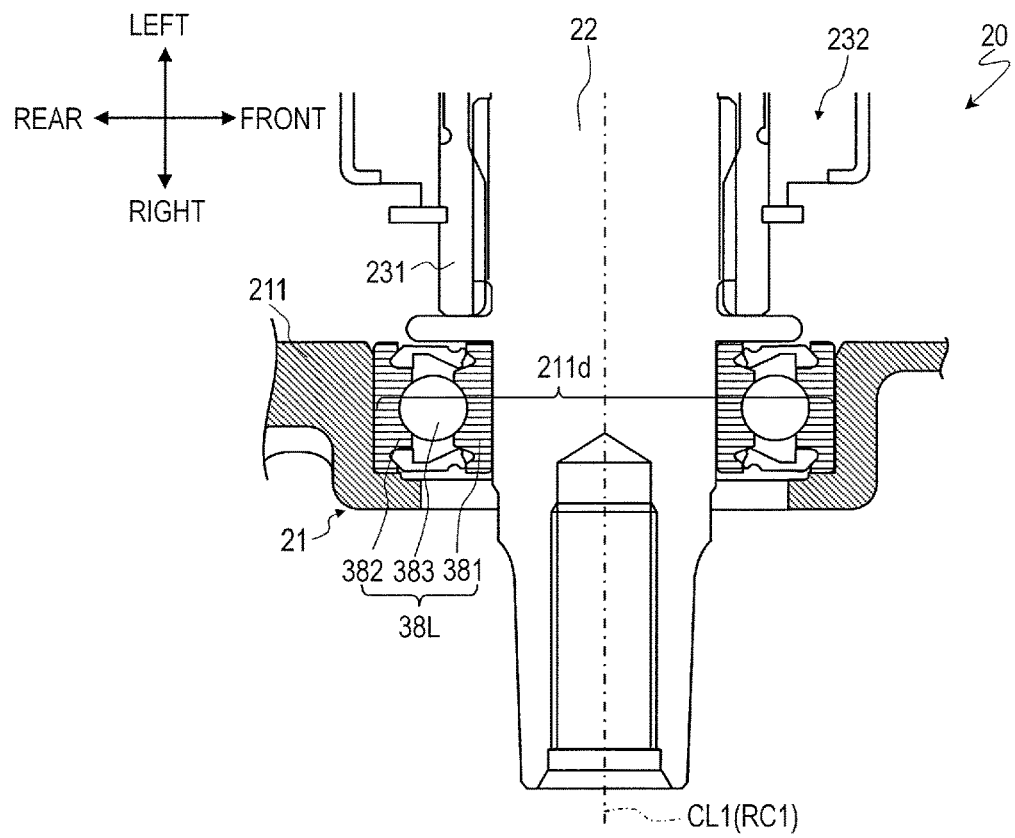
FIG. 11 is a cross-sectional view of still another example of the movement restricting structure, showing an enlarged vicinity of the first bearing 38L.

FIG. 11 shows still another example of the movement restricting structure. In the example shown in FIG. 11, the inner ring 381 of the first bearing 38L is press-fitted to the crank shaft 22, and also the outer ring 382 of the first bearing 38L is press-fitted into an indent 211*d* in the housing 21 (first housing member 211). In the example shown in FIG. 11, the movement restricting structure may be considering to include the indent 211*d* of the housing 21 and the outer ring 382 of the first bearing 38L press-fitted into the indent 211*d*.

As in the example shown in FIG. 11, a structure in which both of the inner ring 381 and the outer ring 382 of the first bearing 38L are press-fitted may be used to suitably restrict movement of the first bearing 38L (i.e., of the crank shaft 22).

As has been described above, any of the structures shown in FIG. 4, FIG. 8, FIG. 9, FIG. 10, and FIG. 11 may be used as the movement restricting structure, such that rattling of the crank shaft 22 is significantly reduced or prevented. From assemblability and aesthetics standpoints, among the above-described structures, structures including the plate-shaped member 60 (i.e., the examples shown in FIG. 4, FIG. 8, and FIG. 9) are preferable. Among the structures including the plate-shaped member 60, the structure shown in FIG. 8 (where the connecting sections 62 are omitted) is preferable in that the plate-shaped member 60 itself is downsized. However, in the structure shown in FIG. 8, the boss 211B will protrude outside of the housing 21 (first housing member 211). Therefore, from an aesthetics standpoint, the structure of FIG. 4 and the structure of FIG. 9 may be more preferable.

Structures in which the pair of circlips 81 and 82 are used, as in the example shown in FIG. 10, do not require the first bearing 38L to be press-fitted to the crank shaft, thus providing an advantage of improved workability during assembly. Moreover, the absence of need for a fastener provides an advantage in that control of the tightening torque is unnecessary.

A structure in which the outer ring 382 of the first bearing 38L is press-fitted into the housing 21 as in the example shown in FIG. 11 provides an advantage in that no additional member needs to be provided to restrict movement.

Figure 12:
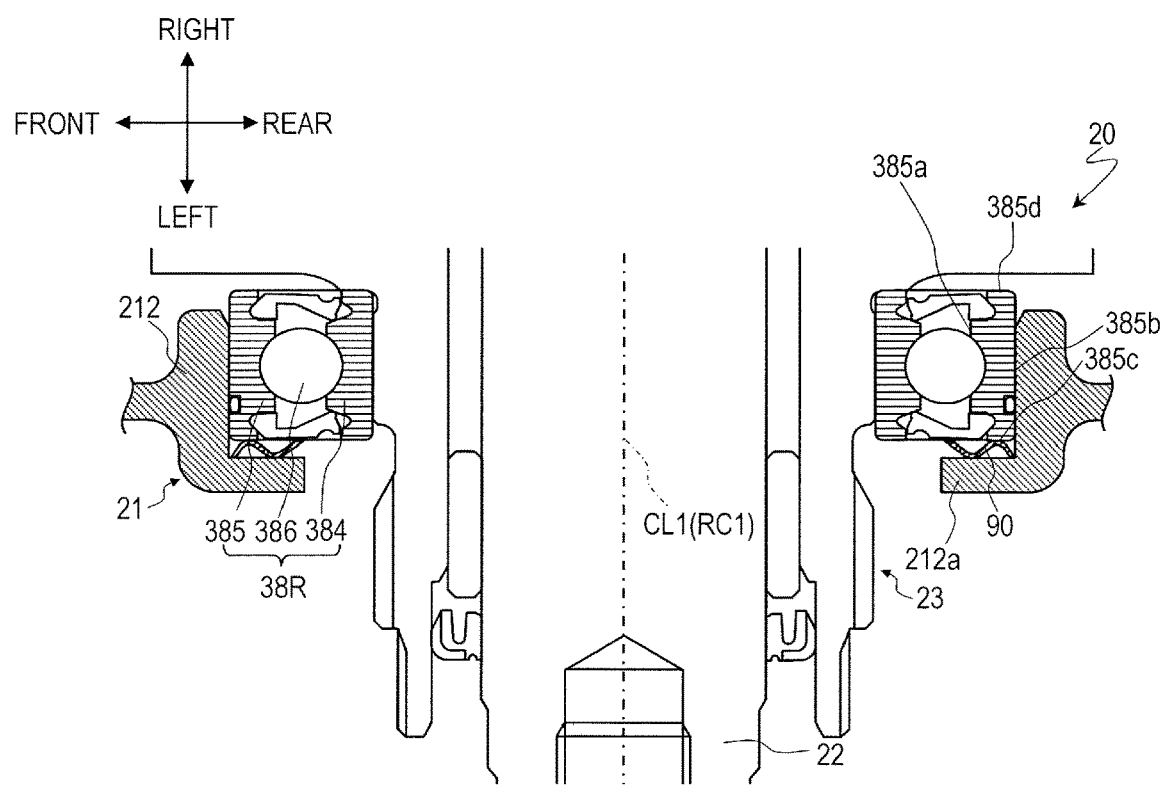
FIG. 12 is a cross-sectional view of another structure that significantly reduces or prevents rattling of the crank shaft, showing an enlarged vicinity of the second bearing 38R.

With reference to FIG. 12, another structure that significantly reduces or prevents rattling of the crank shaft 22 will be described. FIG. 12 is a cross-sectional view showing an enlarged vicinity of a second bearing 38R among a pair of bearings 38L and 38R that rotatably support the crank shaft 22.

The outer ring 385 of the second bearing 38R includes an inner peripheral surface 385*a*, an outer peripheral surface 385*b*, and a first end surface 385*c* and a second end surface 385*d* that connect the inner peripheral surface 385*a* and the outer peripheral surface 385*b* to each other. The first end surface 385*c* is located farther outward in the right-left direction than is the second end surface 385*d*. The housing 21 (second housing member 212) includes an opposing portion 212*a* that is opposed to the first end surface 385*c* of the outer ring 385 of the second bearing 38R.

Between the first end surface 385*c* of the outer ring 385 of the second bearing 38R and the opposing portion 212*a* of the housing 21, an elastic member 90 is provided. The elastic member 90 urges the outer ring 385 of the second bearing 38R inwardly along right-left direction. Herein, the elastic member 90 is preferably a corrugated washer, for example.

The corrugated washer 90 is preferably made of a metal material (e.g., a carbon tool steel or a cold rolled steel for springs).

Although not shown, the outer ring 382 of the first bearing 38L is free-fitted to the housing 21 (first housing member 211), with the inner ring 381 thereof being press-fitted to the crank shaft 22.

Since the second bearing 38R is mounted to the rotary shaft 23 in a manner which restrains the second bearing 38R from moving along the thrust direction relative to the crank shaft 22 (e.g., the inner ring 384 may be press-fitted to the driven member 2332 of the one-way clutch 233), as the corrugated washer 90 inwardly urges the outer ring 385 of the second bearing 38R, the crank shaft 22 is also inwardly urged. As a result, rattling of the crank shaft 22 is significantly reduced or prevented. Moreover, since the corrugated washer (elastic member) 90 has a moderate elasticity, relative rotation between elements which are disposed coaxially with the crank shaft 22 is possible.

In the example shown in FIG. 12, the corrugated washer 90 is provided on the second bearing 38R; alternatively, the corrugated washer 90 may be provided on the first bearing 38L. In other words, the corrugated washer (elastic member) 90 may be provided between the first end surface 382c of the outer ring 382 of the first bearing 38L and the housing 21 (or a portion opposed to the first end surface 382c of the first housing member 211).

In a structure using the corrugated washer 90, if the urging force by the corrugated washer 90 is too weak, rattling of the crank shaft 22 may not be adequately reduced or prevented; if the urging force by the corrugated washer 90 is too strong, play along the thrust direction may become too little. Thus, a somewhat complicated setting of the urging force may be required. On the other hand, the structures shown in FIG. 4, FIG. 8, FIG. 9, FIG. 10, and FIG. 11 do not require any complicated setting of the urging force.

Thus, preferred embodiments of the present invention have been described above; however, the present invention is not limited to the above preferred embodiments. For example, while each of the above preferred embodiments illustrates an electrically assisted bicycle including a suspension, the present invention is suitably applicable to an electrically assisted bicycle which lacks a suspension. Although the above preferred embodiments each illustrate a drive unit of a type in which a human force (pedaling force) and an assistance force (motor driving power) are merged at the crank shaft 22 (merge-at-crank type), preferred embodiments of the present invention are also suitably applicable to drive units of a type in which a human force and an assistance force are merged by a chain (merge-at-chain type).

As described above, a drive unit 20 according to a preferred embodiment of the present invention is mounted to a body frame 12 of an electrically assisted bicycle 10, and generates a driving power which is transmitted to a wheel (rear wheel) 14R. The drive unit 20 includes a housing 21, a motor 25 accommodated in the housing 21, a crank shaft 22 extending through the housing 21 along the vehicle's right-left direction, and a pair of bearings 38L and 38R each including an inner ring 381, 384 and an outer ring 382, 385 and rotatably supporting the crank shaft 22 within the housing 21. The pair of bearings 38L and 38R include a first bearing (38L) which is provided at one side along the thrust direction (i.e., the axial direction of the crank shaft 22) and a second bearing (38R) provided at the other side along the thrust direction. The first bearing 38L is disposed so as not to move along the thrust direction relative to the crank shaft 22. The drive unit 20 includes a movement restricting structure which restricts movement of the first bearing 38L relative to the housing 21 along the thrust direction.

In the drive unit 20 according to a preferred embodiment of the present invention described above, movements of the first bearing 38L relative to the housing 21 are restricted (controlled) along the thrust direction by the movement restricting structure. The first bearing 38L is disposed so as not to move along the thrust direction relative to the crank shaft 22. Since the movement restricting structure restricts movement of the first bearing 38L, movements of the crank shaft 22 relative to the housing 21 are restricted (controlled) along the thrust direction. Thus, according to preferred embodiments of the present invention, rattling of the crank shaft 22 is significantly reduced or prevented.

According to a preferred embodiment of the present invention described above, the inner ring 381 of the first bearing 38L is preferably press-fitted to the crank shaft 22.

By press-fitting the inner ring 381 of the first bearing 38L to the crank shaft 22, for example, the first bearing 38L is restrained from moving along the thrust direction relative to the crank shaft 22.

According to a preferred embodiment of the present invention described above, the outer ring 382 of the first bearing 38L includes an inner peripheral surface 382a, an outer peripheral surface 382b, and a first end surface 382c and a second end surface 382d that connect the inner peripheral surface 382a and the outer peripheral surface 382b to each other. The first end surface 382c is located farther outward in the vehicle's right-left direction than is the second end surface 382d. The housing 21 includes a first abutment 211a that abuts with the first end surface 382c of the outer ring 382 of the first bearing 38L. The movement restricting structure includes the first abutment 211a of the housing 21. The movement restricting structure further includes a plate-shaped member 60 fixed to the housing 21, the plate-shaped member 60 including a second abutment 61 which abuts with the second end surface 382d of the outer ring 382 of the first bearing 38L so that the outer ring 382 of the first bearing 38L is sandwiched by the second abutment 61 and the first abutment 211a of the housing 21.

In the case where the restriction of movement of the first bearing 38L is achieved by sandwiching the outer ring 382 of the first bearing 38L with the first abutment 211a of the housing 21 and the second abutment 61 of the plate-shaped member 60, the movement restricting structure is completely provided within a region where the first abutment 211a of the housing 21 and the second abutment 61 of the plate-shaped member 60 are disposed. As a result, in the region which is located inside the plate-shaped member 60, some play is provided to permit relative rotation between elements which are disposed coaxially with the crank shaft 22 (i.e., the driving member 2331 and the driven member 2332 of the one-way clutch 233).

According to a preferred embodiment of the present invention described above, the plate-shaped member 60 is preferably fixed to the housing 21 by fasteners 70.

The structure in which the plate-shaped member 60 is fixed to the housing by fasteners 70 may be preferable from assemblability and aesthetics standpoints.

According to a preferred embodiment of the present invention described above, the housing 21 preferably includes a protrusion 211b which is continuous with the first abutment 211a and which protrudes along the thrust direction so as to surround the first bearing 38L. The plate-shaped member 60 includes a press-fit portion 65 extending along the thrust direction, the press-fit portion 65 being press-fitted onto the protrusion 211*b* of the housing 21. The plate-shaped member 60 is fixed to the housing 21 by the press-fit portion 65.

The plate-shaped member 60 may include the press-fit portion 65 press-fitted onto the protrusion 211*b* of the housing 21 such that the plate-shaped member 60 is fixed to the housing 21 by the press-fit portion 65.

According to a preferred embodiment of the present invention described above, the inner ring 381 of the first bearing 38L preferably includes an inner peripheral surface 381*a*, an outer peripheral surface 381*b*, and a first end surface 381*c* and a second end surface 381*d* that connect the inner peripheral surface 381*a* and the outer peripheral surface 381*b* to each other. The drive unit 20 further includes a first circlip 81 and a second circlip 82 that sandwich the inner ring 381 of the first bearing 38L, the first circlip 81 abutting with the first end surface 381*c*, and the second circlip 82 abutting with the second end surface 381*d*. The housing 21 includes an indent 211*d* into which the outer ring 382 of the first bearing 38L is press-fitted. The movement restricting structure includes the indent 211*d* of the housing 21 and the outer ring 382 of the first bearing 38L press-fitted in the indent 211*d*.

With the use of the pair of circlips (the first circlip 81 and the second circlip 82) sandwiching the inner ring 381 of the first bearing 38L, too, the first bearing 38L is restrained from moving along the thrust direction relative to the crank shaft 22. The structure using the first circlip 81 and the second circlip 82 does not require the first bearing 38L to be press-fitted to the crank shaft 22, thus providing an advantage of improved workability during assembly. In the structure using the first circlip 81 and the second circlip 82, restriction of movement of the first bearing 38L relative to the housing 21 may be achieved by virtue of the outer ring 382 of the first bearing 38L being press-fitted into the indent 211*d* of the housing 21. In the case where restriction of movement is achieved in this manner, the movement restricting structure is completely provided within a region where the outer ring 382 of the first bearing 38L is press-fitted into the indent 211*d* of the housing 21. As a result, in the region which is located inside of that region, some play is provided to permit relative rotation between elements which are disposed coaxially with the crank shaft 22. In the structure in which the outer ring 382 of the first bearing 38L is press-fitted, the absence of a need for a fastener also provides an advantage in that control of the tightening torque is unnecessary.

According to a preferred embodiment of the present invention described above, the outer ring 382 of the first bearing 38L preferably includes an inner peripheral surface 382*a*, an outer peripheral surface 382*b*, and a first end surface 382*c* and a second end surface 382*d* that connect the inner peripheral surface 382*a* and the outer peripheral surface 382*b* to each other. The first end surface 382*c* of the outer ring 382 of the first bearing 38L is located farther outward in the vehicle's right-left direction than is the second end surface 382*d* of the outer ring 382 of the first bearing 38. The drive unit 20 further includes a third circlip 83 which abuts with the second end surface 382*d* of the outer ring 382 of the first bearing 38L.

Providing the third circlip 83 abutting with the second end surface 382*d* of the outer ring 382 of the first bearing 38L better prevents the outer ring 382 of the first bearing 38L having been press-fitted to the housing 21 from becoming detached.

According to a preferred embodiment of the present invention described above, the housing 21 preferably includes an indent 211*d* into which the outer ring 382 of the first bearing 38L is press-fitted, and the movement restricting structure includes the indent 211*d* of the housing 21 and the outer ring 382 of the first bearing 38L press-fitted into the indent 211*d*.

Restriction of movements of the first bearing 38L is achieved suitably by virtue of the inner ring 381 of the first bearing 38L being press-fitted to the crank shaft 22 and by virtue of the outer ring 382 of the first bearing 38L being press-fitted into the indent 211*d* of the housing 21. Using such a structure provides an advantage in that no additional member needs to be provided to restrict movement.

A drive unit 20 according to a preferred embodiment of the present invention is mounted to a body frame 12 of an electrically assisted bicycle 10, and generates a driving power to be transmitted to a wheel (rear wheel) 14R. The drive unit 20 includes a housing 21, a motor 25 accommodated in the housing 21, a crank shaft 22 extending through the housing 21 along the vehicle's right-left direction, and a pair of bearings 38L and 38R each including an inner ring 381, 384 and an outer ring 382, 385 and rotatably supporting the crank shaft 22 within the housing 21. The pair of bearings 38L and 38R includes a first bearing (38L) which is provided at one side along the thrust direction (i.e., the axial direction of the crank shaft 22) and a second bearing (38R) provided at the other side along the thrust direction. The outer ring 382 or 385 of the first bearing 38L or the second bearing 38R includes an inner peripheral surface 382*a* or 385*a*, an outer peripheral surface 382*b* or 385*b*, and a first end surface 382*c* or 385*c* and a second end surface 382*d* or 385*d* that connect the inner peripheral surface 382*a* or 385*a* and the outer peripheral surface 382*b* or 385*b* to each other. The first end surfaces 382*c* and 385*c* are located farther outward in the vehicle's right-left direction than are the second end surfaces 382*d* and 385*d*. The housing 21 includes an opposing portion 212*a* that is opposed to the first end surface 382*c*, 385*c* of the outer ring 382, 385. The drive unit 20 further includes an elastic member 90 which is provided between the opposing portion 212*a* of the housing 21 and the first end surface 382*c*, 385*c* of the outer ring 382, 385, the elastic member 90 urging the outer ring 382, 385 inwardly along the vehicle's right-left direction.

In the above-described drive unit 20, between the first end surface 382*c* or 385*c* of the outer ring 382 or 385 of the first bearing 38L or the second bearing 38R and the opposing portion 212*a* (i.e., a portion opposed to the first end surface 382*c*, 385*c*) of the housing 21, an elastic member 90 is provided which urges the outer ring 382, 385 inwardly along the vehicle's right-left direction. Since the elastic member 90 inwardly urges the outer ring 382 or 385 of the first bearing 38L or the second bearing 38R, the crank shaft 22 is inwardly urged. As a result, rattling of the crank shaft 22 is significantly reduced or prevented. Since the elastic member 90 has a moderate elasticity, relative rotation between elements which are disposed coaxially with the crank shaft 22 is possible.

According to a preferred embodiment of the present invention, the elastic member 90 is preferably a corrugated washer.

As the elastic member 90, a corrugated washer, for example, is suitable.

An electrically assisted bicycle 10 according to a preferred embodiment of the present invention includes the drive unit 20 of any of the above-described structures.

When the electrically assisted bicycle 10 includes a drive unit 20 according to a preferred embodiment of the present invention, rattling of the crank shaft 22 is significantly reduced or prevented, so that a user who is accustomed to the traditional bicycle will feel less of an abnormality.

According to preferred embodiments of the present invention, drive units and electrically assisted bicycles in which rattling of the crank shaft is significantly reduced or prevented are provided. In drive units and electrically assisted bicycles according to preferred embodiments of the present invention, rattling of the crank shaft is significantly reduced or prevented so that a user who is accustomed to a traditional bicycle will feel less of an abnormality.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive unit for generating a driving power which is transmitted to a wheel of an electrically assisted bicycle, the drive unit comprising:
   a housing;
   a motor accommodated in the housing;
   a crank shaft extending through the housing along a right-left direction of the bicycle; and
   a pair of bearings rotatably supporting the crank shaft within the housing, each of the pair of bearings including an inner ring and an outer ring; wherein
   the pair of bearings define a first bearing which is provided at one side along a thrust direction and a second bearing which is provided at another side along the thrust direction, the thrust direction corresponding to an axial direction of the crank shaft;
   the first bearing is disposed so as not to move along the thrust direction relative to the crank shaft; and
   the drive unit further comprises a movement restricting structure that restricts movement of the first bearing relative to the housing along the thrust direction;
   the outer ring of the first bearing includes an inner peripheral surface, an outer peripheral surface, and a first end surface and a second end surface that connect the inner peripheral surface and the outer peripheral surface to each other;
   the first end surface is located farther outward in the right-left direction of the bicycle than is the second end surface;
   the housing includes a first abutment which abuts with the first end surface of the outer ring of the first bearing;
   the movement restricting structure includes the first abutment of the housing;
   the movement restricting structure further includes a plate fixed to the housing, the plate including a second abutment which abuts with the second end surface of the outer ring of the first bearing so that the outer ring of the first bearing is sandwiched by the second abutment and the first abutment of the housing;
   the plate includes an alignment section that engages with a predetermined portion of the housing;
   the alignment section includes a first extension that extends from the second abutment in a direction which is inclined with respect to the thrust direction, a second extension that extends from the first extension in a direction which intersects the first extension, and a recess defined by the second extension; and
   the recess of the alignment section engages with the predetermined portion of the housing.

2. The drive unit of claim 1, wherein the inner ring of the first bearing is press-fitted to the crank shaft.

3. The drive unit of claim 2, wherein the plate is fixed to the housing by a fastener.

4. The drive unit of claim 2, wherein
   the housing includes an indent into which the outer ring of the first bearing is press-fitted; and
   the movement restricting structure includes the indent of the housing and the outer ring of the first bearing press-fitted to the indent.

5. The drive unit of claim 1, wherein
   the inner ring of the first bearing includes an inner peripheral surface, an outer peripheral surface, and a first end surface and a second end surface that connect the inner peripheral surface and the outer peripheral surface to each other;
   the drive unit further comprises a first circlip and a second circlip sandwiching the inner ring of the first bearing, the first circlip abutting with the first end surface, and the second circlip abutting with the second end surface;
   the housing includes an indent into which the outer ring of the first bearing is press-fitted; and
   the movement restricting structure includes the indent of the housing and the outer ring of the first bearing press-fitted into the indent.

6. The drive unit of claim 5, wherein
   the drive unit further comprises a third circlip which abuts with the second end surface of the outer ring of the first bearing.

7. An electrically assisted bicycle comprising the drive unit of claim 1.

8. A drive unit for generating a driving power which is transmitted to a wheel of an electrically assisted bicycle, the drive unit comprising:
   a housing;
   a motor accommodated in the housing;
   a crank shaft extending through the housing along a right-left direction of the bicycle; and
   a pair of bearings rotatably supporting the crank shaft within the housing, each of the pair of bearings including an inner ring and an outer ring; wherein
   the pair of bearings define a first bearing which is provided at one side along a thrust direction and a second bearing which is provided at another side along the thrust direction, the thrust direction corresponding to an axial direction of the crank shaft;
   the first bearing is disposed so as not to move along the thrust direction relative to the crank shaft;
   the drive unit further comprises a movement restricting structure that restricts movement of the first bearing relative to the housing along the thrust direction;
   the inner ring of the first bearing is press-fitted to the crank shaft;
   the outer ring of the first bearing includes an inner peripheral surface, an outer peripheral surface, and a first end surface and a second end surface that connect the inner peripheral surface and the outer peripheral surface to each other;
   the first end surface is located farther outward in the right-left direction of the bicycle than is the second end surface;
   the housing includes a first abutment which abuts with the first end surface of the outer ring of the first bearing;
   the movement restricting structure includes the first abutment of the housing;
   the movement restricting structure further includes a plate fixed to the housing, the plate including a second abutment which abuts with the second end surface of the outer ring of the first bearing so that the outer ring of the first bearing is sandwiched by the second abutment and the first abutment of the housing;

the housing includes a protrusion which is continuous with the first abutment and which protrudes along the thrust direction so as to surround the first bearing;

the plate includes a press-fit portion which extends along the thrust direction and which is press-fitted onto the protrusion of the housing; and the plate is fixed to the housing by the press-fit portion.

\* \* \* \* \*